US010920863B2

(12) United States Patent
Chino

(10) Patent No.: US 10,920,863 B2
(45) Date of Patent: Feb. 16, 2021

(54) DRIVE TRANSMISSION DEVICE

(71) Applicant: CANON KABUSHIKI KAISHA, Tokyo (JP)

(72) Inventor: Hideto Chino, Ashigarakami-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 15/428,198

(22) Filed: Feb. 9, 2017

(65) Prior Publication Data

US 2017/0248211 A1    Aug. 31, 2017

(30) Foreign Application Priority Data

Feb. 26, 2016 (JP) ................................ 2016-035429

(51) Int. Cl.
| | |
|---|---|
| *F16H 27/08* | (2006.01) |
| *F16H 1/20* | (2006.01) |
| *B65H 3/06* | (2006.01) |
| *B41J 23/08* | (2006.01) |
| *F16H 35/00* | (2006.01) |

(52) U.S. Cl.
CPC .............. *F16H 27/08* (2013.01); *B41J 23/08* (2013.01); *B65H 3/0669* (2013.01); *F16H 1/206* (2013.01); *B65H 2403/421* (2013.01); *B65H 2403/722* (2013.01); *F16H 2035/005* (2013.01); *F16H 2035/006* (2013.01)

(58) Field of Classification Search
CPC .............. B41J 23/08; B65H 2403/421; B65H 2403/722; B65H 3/0669; F16H 1/206; F16H 2035/005; F16H 2035/006; F16H 27/08

USPC ........................................................ 74/436
See application file for complete search history.

(56) References Cited

U.S. PATENT DOCUMENTS

| | | | | | |
|---|---|---|---|---|---|
| 2,823,561 | A | * | 2/1958 | Opocensky | ............ G04B 1/205 |
| | | | | | 192/138 |
| 2,881,630 | A | * | 4/1959 | Opocensky | ........... G06M 1/101 |
| | | | | | 74/435 |

(Continued)

FOREIGN PATENT DOCUMENTS

| CN | 101661244 A | 3/2010 |
|---|---|---|
| CN | 104950642 A | 9/2015 |

(Continued)

OTHER PUBLICATIONS

Chinese Office Action issued in corresponding Chinese Application No. 201710101173.6 dated Jan. 28, 2019.

(Continued)

*Primary Examiner* — Joseph Brown
(74) *Attorney, Agent, or Firm* — Venable LLP

(57) ABSTRACT

A drive transmission device includes a rotatable driving member; a rotatable follower member, and an elastic member. The drive transmission device includes a first rotatable member and a second rotatable member. The first rotatable member includes first and second driving portions and a limiting portion. The second rotatable member includes a first driven portion, a second driven portion and a contact portion contacting the limiting portion. The second driving portion is adjacent to the limiting portion with respect to a rotational axis direction of the first rotatable member. The second driven portion is adjacent to the contact portion with respect to a rotational direction of the second rotatable member.

6 Claims, 24 Drawing Sheets

(a)

(b)

(56) References Cited

U.S. PATENT DOCUMENTS

| | | | | |
|---|---|---|---|---|
| 3,813,952 | A | * | 6/1974 | Fehrenbacher ......... F16H 27/08 |
| | | | | 74/435 |
| 5,816,523 | A | * | 10/1998 | Hori ....................... F16H 27/08 |
| | | | | 242/382.1 |
| 8,382,094 | B2 | * | 2/2013 | Hayakawa ........... B65H 3/0607 |
| | | | | 271/10.04 |
| 2009/0282936 | A1 | | 11/2009 | Chen et al. |
| 2010/0054814 | A1 | | 3/2010 | Sakurai et al. |
| 2015/0033888 | A1 | * | 2/2015 | Kuroda ................... F16H 27/08 |
| | | | | 74/405 |
| 2015/0277281 | A1 | | 10/2015 | Mushika et al. |

FOREIGN PATENT DOCUMENTS

| | | | | |
|---|---|---|---|---|
| CN | 106154782 | A | | 11/2016 |
| DE | 707242 | C | * | 6/1941 ............. F16H 27/08 |
| DE | 2905103 | A1 | * | 8/1980 ........... B65H 3/0669 |
| DE | 2936004 | A1 | * | 4/1981 ............. F16H 27/08 |
| EP | 1895194 | A2 | * | 3/2008 ........... F16H 19/001 |
| FR | 2636149 | A1 | * | 3/1990 ............. F16H 27/08 |
| JP | 50-63361 | A | | 5/1975 |
| JP | 53-14025 | A | | 2/1978 |
| JP | S60-121350 | A | | 6/1985 |
| JP | H04-92144 | A | | 3/1992 |
| JP | 04300445 | A | * | 10/1992 |
| JP | 2010-112975 | A | | 5/2010 |
| JP | 2015-018040 | A | | 1/2015 |

OTHER PUBLICATIONS

Office Action dated Nov. 19, 2019, in Japanese Patent Application No. 2016-035429.

\* cited by examiner (a)

(b)

US 10,920,863 B2

DRIVE TRANSMISSION DEVICE

FIELD OF THE INVENTION AND RELATED ART

The present invention relates to a drive transmission device for intermittently transmitting a driving force.

Conventionally, there is a clutch device as the drive transmission device switching between transmission and disconnection of the driving force from a driving source to a driven member (member-to-be-driven) as disclosed in Japanese Laid-Open Patent Application (JP-A) 2015-18040.

The clutch device disclosed in JP-A 2015-18040 includes a driving gear always rotated by the driving source and a follower gear (driven gear) for transmitting the driving force to the driven member by rotating in engagement with the driving gear, and the follower gear is provided with a tooth-omitted portion. Further, the follower gear is locked by a locking member and is stopped at a position where the tooth-omitted portion opposes the driving gear, so that drive transmission from the driving gear to the follower gear is disconnected. Further, by eliminating (releasing) the locking of the follower gear by the locking member, the follower gear is engaged again with the driving gear and thus is rotated. By employing such a constitution, drive transmission to the driven member and disconnection of drive (driving force) transmitted to the driven member are switched.

Further, in JP-A 2015-18040, a first rotatable member rotating in synchronism with the follower gear is provided with a convex arcuate surface, and a second rotatable member, rotated by the first rotatable member, for driving the driven member is provided with a concave arcuate surface formed concentrically with a rotation center of the first rotatable member.

In the case where when the follower gear is stopped, the follower gear is rotated to a position where the tooth-omitted portion of the follower gear opposes the driving gear or in the case where the stopped follower gear is rotated again to a position where the follower gear engages with the driving gear, the follower gear is driven by an elastic force of a spring or the like.

At this time, the convex arcuate surface of the first rotatable member and the concave arcuate surface of the second rotatable member slide with each other while contacting each other, and the second rotatable member does not rotate. Accordingly, the follower gear can be rotated without rotating the driven member, with the result that the elastic force of the spring can be reduced.

Thus, in the clutch device disclosed in JP-A 2015-18040, the first rotatable member rotating with rotation of the follower gear and the second rotatable member rotating intermittently are provided with an intermittently sliding portion. Further, in an intermittent state in which the first rotatable member rotates but the second rotatable member does not rotate, a position of the second rotatable member is limited by the convex arcuate surface which is the intermittently sliding portion of the first rotatable member.

However, in the above-described drive transmission constitution, in consideration of accuracy of a distance between rotation centers of the first and second rotatable members and a dimensional accuracy of the convex arcuate surface and the concave arcuate surface, there is a need to provide a difference in diameter between the convex arcuate surface of the first rotatable member and the concave arcuate surface of the second rotatable member. Possible problems caused due to the difference in diameter will be described with reference to FIGS. 23 and 24.

FIG. 23 is a schematic view of a gear pair DR provided with intermittently sliding portions and shows a state in which a convex arcuate surface 1a of a first rotatable member 1 and a concave arcuate surface 2a of a second rotatable member 2. In FIG. 24, (a) to (c) are schematic views of the gear pair DR provided with the intermittently sliding portions, in which (a) shows a state in which a first rotatable member gear portion 1b engages with a second rotatable member gear portion 2b, (b) shows a state in which the convex arcuate surface 1a of the first rotatable member 1 and the concave arcuate surface 2a of the second rotatable member oppose each other, and (c) shows a state immediately before the first rotatable member gear portion 1b rotates the second rotatable member 2.

First, as shown in FIG. 23, a diameter of the convex arcuate surface 1a of the first rotatable member 1 is constituted so as to be equal to a pitch diameter of the first rotatable member gear portion 1b, and the concave arcuate surface 2a of the second rotatable member 2 is provided at three positions with respect to a center of a rotation shaft 2c of the second rotatable member 2.

A diameter of the concave arcuate surface 2a is constituted so as to be somewhat larger than the sum of the diameter of the convex arcuate surface 1a and an arcuate surface gap G1 formed concentrically with the convex arcuate surface 1a. At each of end portions of the concave arcuate surface 2a of the second rotatable member 2, a tooth surface 2d similar to the second rotatable member gear portion 2b is provided.

In FIG. 24, a driving load of a driven member R connected with the rotation shaft 2c is exerted on the second rotatable member 2.

First, in (a) of FIG. 24, the first rotatable member gear portion 1b and the second rotatable member gear portion 2b are in an engaged state each other, and the second rotatable member 2 rotates in the counterclockwise direction with rotation of the first rotatable member 1 in the clockwise direction.

Then, in (b) of FIG. 24, the first rotatable member 1 further rotates, and a state in which the convex arcuate surface 1a of the first rotatable member 1 and the concave arcuate surface 2a of the second rotatable member 2 oppose each other is formed, so that even when the first rotatable member 1 rotates, the second rotatable member 2 performs an intermittent operation and thus rotation of the second rotatable member 2 stops.

When the state in which the convex arcuate surface 1a and the concave arcuate surface 2a oppose each other as described above, a rotational load is exerted on the second rotatable member 2. For that reason, a state of one-side contact such that an upstream end portion of the concave arcuate surface 2a with respect to a rotational direction contacts the convex arcuate surface 1a but a downstream end portion of the concave arcuate surface 2a with respect to the rotational direction does not contact the convex arcuate surface 1a is formed. An arcuate surface gap G2 at this time is larger than the arcuate surface gap G1 (G2>G1).

For this reason, as shown in (c) of FIG. 24, the first rotatable member gear portion 1b of the first rotatable member 1 engages with the downstream tooth surface 2d of the end portion of the concave arcuate surface 2a of the second rotatable member 2 and will rotate the second rotatable member 2 again. At that time, the downstream tooth surface 2d of the end portion of the concave arcuate surface 2a is positioned in a direction (indicated by an arrow in the figure) in which the downstream tooth surface 2d will move away from an engaging position of the first rotatable member gear portion 1b of the first rotatable member 1.

In such a state, the downstream tooth surface 2d of the end portion of the concave arcuate surface 2a of the second rotatable member 2 moves away from the engaging position of the first rotatable member gear portion 1b of the first rotatable member 1 with an increasing arcuate surface gap G provided between the convex arcuate surface 1a of the first rotatable member 1 and the concave arcuate surface 2a of the second rotatable member 2.

Similarly, in the case where a distance between the rotation centers of the first rotatable member 1 and the second rotatable member 2 is a large dimension within tolerance or in the case where arcuate diameter accuracy of the convex arcuate surface 1a and the concave arcuate surface 2a is a small dimension within tolerance, a position of the downstream tooth surface 2d of the end portion of the concave arcuate surface 2a of the second rotatable member 2 moves away from the engaging position of the first rotatable member gear portion 1b.

As described above, in either state, when the first rotatable member 1 will rotate the second rotatable member 2 again, an amount of engagement between the first rotatable member gear portion 1b and the tooth surface 2d of the second rotatable member 2 becomes small and thus there is a liability that the second rotatable member 2 cannot rotate.

In order to solve this problem, for the purpose of minimize the arcuate surface gap G1 provided between the convex arcuate surface 1a of the first rotatable member 1 and the concave arcuate surface 2a of the second rotatable member 2, there was a need to improve part accuracy such as the distance between the rotation centers of the first rotatable member 1 and the second rotatable member 2, or the arcuate diameter of the convex arcuate surface 1a and the concave arcuate surface 2a. As a result, such a problem of an increase in cost generated.

On the other hand, the above-described problem is liable to occur with a smaller module of the first rotatable member gear portion 1b and the second rotatable member gear portion 2b. For this reason, in the above-described conventional example, gears of a large module have to be used, so that the large module led to problems such as increases in size and cost of the gear pair DR.

SUMMARY OF THE INVENTION

A principal object of the present invention to provide a drive transmission device, for intermittently transmitting drive (driving force), in which when a first rotatable member will rotate a second rotatable member after an intermittent operation of the second rotatable member, the first rotatable member rotates the second rotatable member with reliability.

According to an aspect of the present invention, there is provided a drive transmission device comprising: a rotatable driving member; a rotatable follower member configured to rotate in engagement with the rotatable driving member; and an elastic member configured to rotate the rotatable follower member by an elastic force when the rotatable follower member is not engaged with the rotatable driving member, wherein the drive transmission device transmits a driving force from the rotatable driving member to a driven member via the rotatable follower member, wherein a first rotatable member configured to rotate in synchronism with the rotatable follower member and a second rotatable member configured to rotate the driven member by being rotated by the first rotatable member are provided downstream of the rotatable follower member of a driving train for transmitting the driving force from the rotatable driving member to the driven member, wherein the first rotatable member includes first and second driving portions configured to drive the second rotatable member and a limiting portion having an arcuate shape concentric with a rotation center of the first rotatable member and configured to limit rotation of the second rotatable member, wherein the second rotatable member includes a first driven portion to be driven by the first driving portion, a second driven portion to be driven by the second driving portion, and a contact portion contacting the limiting portion, wherein the second driving portion is adjacent to the limiting portion with respect to a rotational axis direction of the first rotatable member, and wherein the second driven portion is adjacent to the contact portion with respect to a rotational direction of the second rotatable member.

Further features of the present invention will become apparent from the following description of exemplary embodiments with reference to the attached drawings.

DESCRIPTION OF THE EMBODIMENTS

Embodiments of the present invention will be specifically described with reference to the drawings. Dimensions, materials, shapes and relative arrangements of constituent elements described in the following embodiments should be appropriately be changed depending on structures and various conditions of devices (apparatuses) to which the present invention is applied. Accordingly, the scope of the present invention is not intended to be limited to the following embodiments unless otherwise specified.

First Embodiment

As a drive transmission device for intermittently transmitting drive (driving force), a clutch device using a gear pair provided with an intermittent sliding portion will be described below as an example.

[Clutch Device CL1]

First, a constitution of a clutch device CL1, including a gear pair DR1 provided with the intermittent sliding portion, for switching transmission and disconnection of a driving force from a driving source M to a driven member (member to be driven) R will be described using FIGS. 1 to 6.

Figure 1:
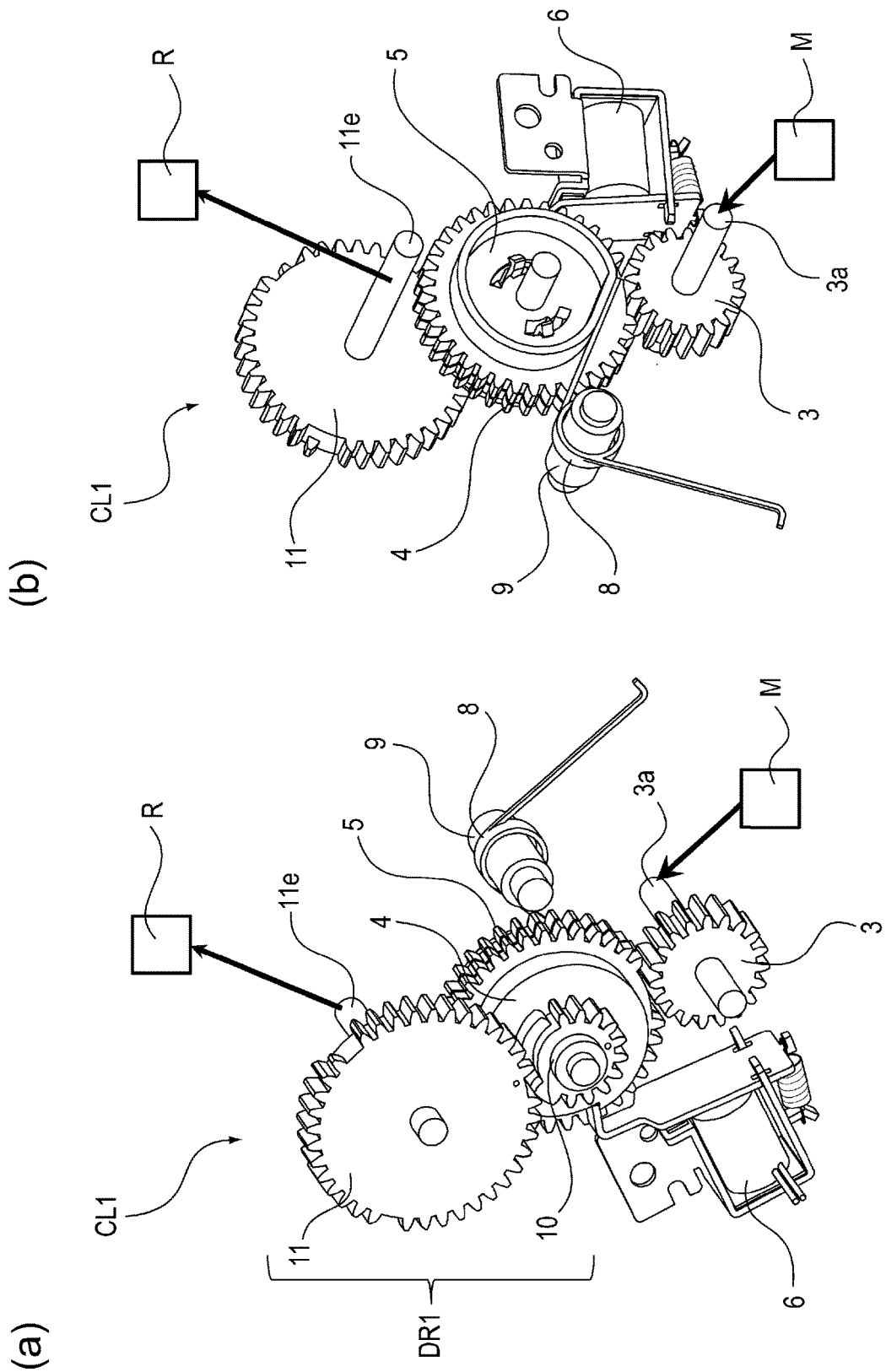
In FIG. 1, (a) is a perspective view of a clutch device CL1 as seen from a front side, and (b) is a perspective view of the clutch device CL1 as seen from a back (rear) side.

In FIG. 1, (a) and (b) are perspective views of the clutch device CL1 and show a relationship between a front side and a back side of the clutch device CL1. In the following, the side shown in (a) of FIG. 1 is the "front side", and the side shown in (b) of FIG. 1 is the "back side".

In FIG. 1, the clutch device CL1 includes a driving gear 3 (rotatable driving member) rotated by always drive-connecting the driving source M with a drive rotation shaft 3a, a follower gear (driven gear) 5 (rotatable follower (driven) member) engageable with the driving gear 3, and a trigger gear 4 (another rotatable follower member). The clutch device CL1 further includes an intermittent input gear 10 (first rotatable member) rotated by being drive-connected with the follower gear 5 and a gear pair DR1 of an intermittent output gear 11 (second rotatable member) engageable with the intermittent input gear 10. Further, the clutch device CL1 includes a solenoid 6 as a means for limiting (preventing) rotation of the trigger gear 4 and a torsion spring 8 (elastic member) for imparting an urging force to the follower gear 5.

The driving force from the driving source M is transmitted to the intermittent output gear 11 via the driving gear 3, the trigger gear 4, the follower gear 5 and the intermittent input gear 10, so that the driven member R is driven. The intermittent input gear 10 as the first rotatable member and the intermittent output gear 11 as the second rotatable member are provided downstream of the follower gear 5 of a driving train for transmitting the driving force from the driving gear 3 to the driven member R.

Figure 2:
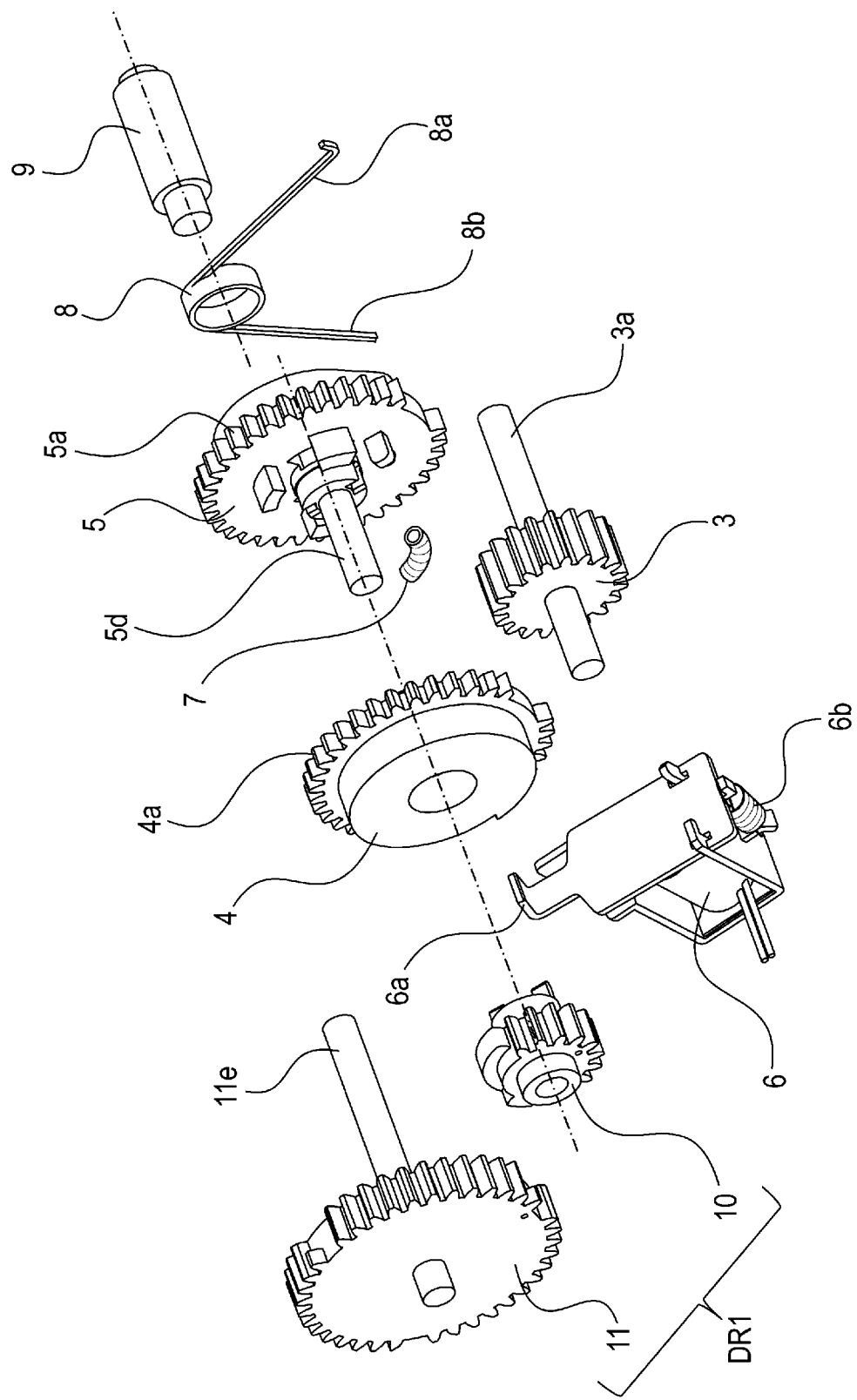
FIG. 2 is an exploded perspective view of the clutch device CL1 before assembling.
Figure 3:
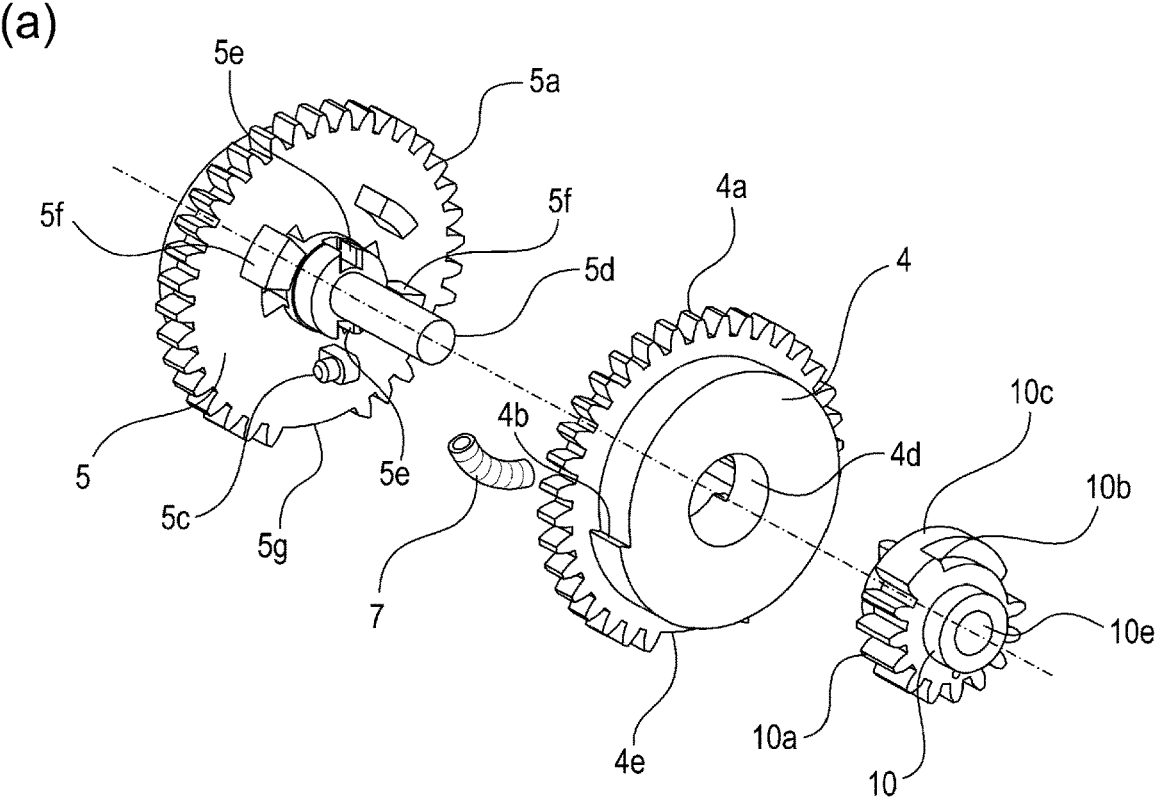
In FIG. 3, (a) is an exploded perspective view for illustrating assembling of a trigger gear 4 and a follower gear (driven gear) 5, and (b) is an exploded perspective view for illustrating the assembling of the trigger gear 4 and the follower gear 5.
Figure 3:
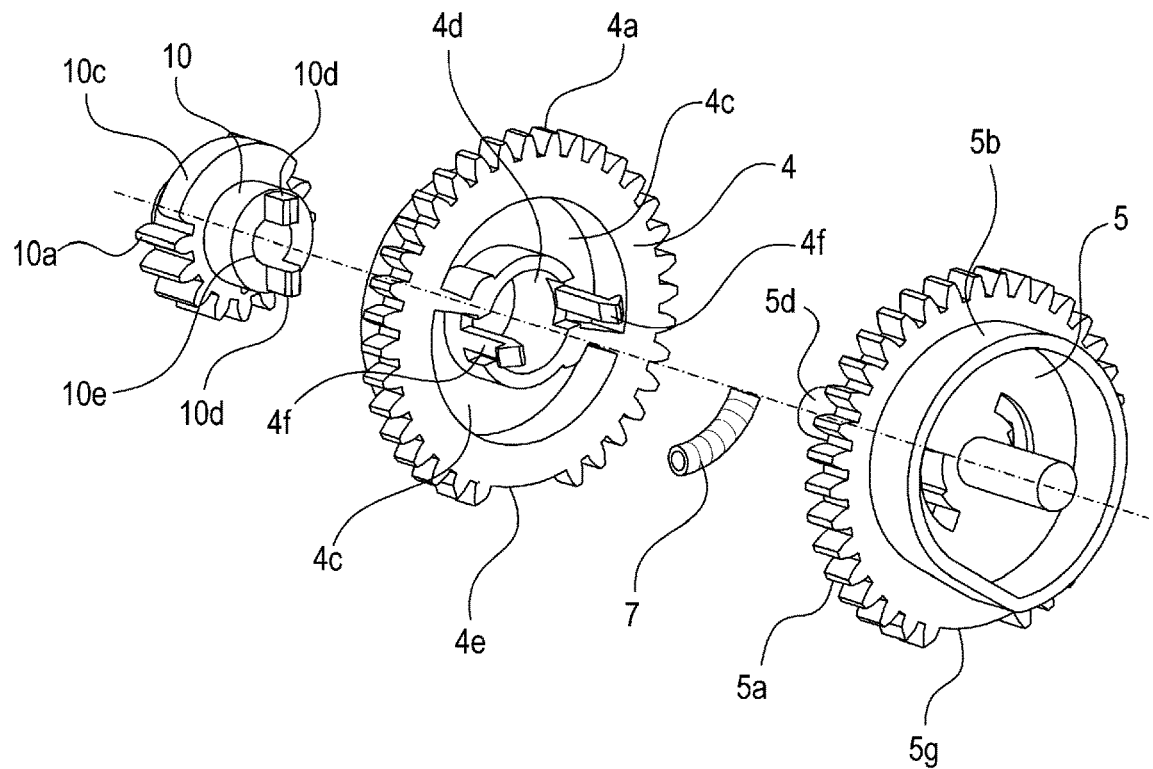

FIG. 2 is a perspective view of the clutch device CL1 before assembling. In FIG. 3, (a) and (b) are perspective views for illustrating assembling of the trigger gear, the follower gear and the intermittent input gear, in which (a) is the perspective view as seen from the front side, and (b) is the perspective view as seen from the back side.

In FIGS. 2 and 3, the trigger gear 4 integrally includes a trigger gear portion 4a engageable with the driving gear 3, a locking portion 4b where rotation of the trigger gear 4 is limited (prevented) by being locked with a locking claw 6a of the solenoid 6, a groove portion 4c in which a trigger spring 7 is accommodated, a bearing portion 4d, and a claw 4f. As a part of the trigger gear portion 4a, a tooth-omitted trigger portion 4e which does not engage with the driving gear 3 is provided, and the bearing portion 4d is rotatably supported by a rotation shaft 5d of the follower gear 5. The claw 4f effect positioning with the follower gear 5 with respect to an axial direction.

In this embodiment, a gear of the trigger gear portion 4a has a tooth-number diameter corresponding to 36 teeth, and a toothed portion constituting the trigger gear portion 4a is constituted by 33 teeth, and the tooth-omitted trigger gear portion is constituted by a size driving gear 3 teeth of the trigger gear portion 4a.

The follower gear 5 integrally includes a follower gear portion 5a engageable with the driving gear 3, a cam portion 5b to which the torsion spring 8 is contacted, a boss 5c on which the trigger gear spring 7 is provided, the rotation shaft 5d, a recessed connecting portion 5e, and a key portion 5f. As a part of the follower gear portion 5a, a tooth-omitted follower portion 5g which does not engage with the driving gear 3 is provided. The recessed connecting portion 5e and the key portion 5f are provided at a plurality of positions.

In this embodiment, similarly as in the case of the trigger gear portion 4a, a gear of the follower gear portion 5a has a tooth-number diameter corresponding to 36 teeth, and a toothed portion constituting the follower gear portion 5a is constituted by 33 teeth, and the tooth-omitted follower gear portion is constituted by a size driving gear 3 teeth of the follower gear portion 5a.

The solenoid 6 includes the locking claw 6a and a return spring 6b. The return spring 6b urges the locking claw 6a in a direction toward the trigger gear 4, and when the solenoid 6 is not energized and the locking portion 4b is in a position opposing the locking claw 6a, the locking claw 6a locks the locking portion 4b and can limit prevent the rotation of the trigger gear 4. When the solenoid 6 is energized, the locking claw 6a is retracted from the trigger gear 4 against an urging force of the return spring 6b, so that in the case where the locking portion 4b is locked by the locking claw 6a until then, the locking of the locking portion 4b of the trigger gear 4 by the locking claw 6a can be eliminated (released).

The trigger gear spring 7 is fixed to the boss 5c of the follower gear 5 at one end thereof, and is accommodated in the groove portion 4c of the trigger gear 4 at the other end thereof, so that the trigger gear spring 7 urges the trigger gear 4 toward the follower gear 5 in a rotational direction.

An arrangement of the trigger gear 4 and the follower gear 5 will be described. As shown in (a) and (b) of FIG. 3, the trigger gear 4 includes the bearing portion 4d and the plurality of groove portions 4c, and when the trigger gear 4 is mounted to the follower gear 5 by the claws 4f, the bearing portion 4d is rotatably accommodated around the rotation shaft 5d of the follower gear 5. At that time, the plurality of key portions 5f provided on the follower gear 5 are accommodated in the groove portions 4c. In a state in which the key portions 5f are accommodated in the groove portions 4c, play is provided between the key portion 5f and the groove portion 4c, so that the trigger gear 4 can rotate about the rotation shaft 5d relative to the follower gear 5 by an amount of the play.

Figure 4:
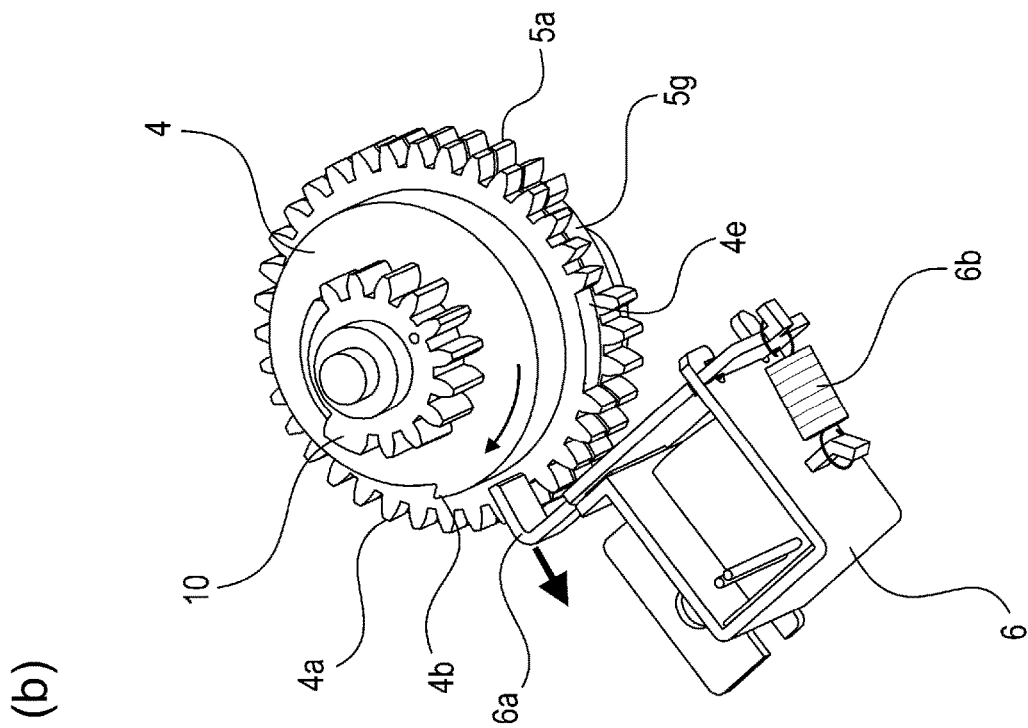
In FIG. 4, (a) is a perspective view showing a state in which a locking portion 4b of the trigger gear 4 is locked, and (b) is a perspective view showing a state in which the locking of the locking portion 4b of the trigger gear 4 is eliminated (released).
Figure 4:
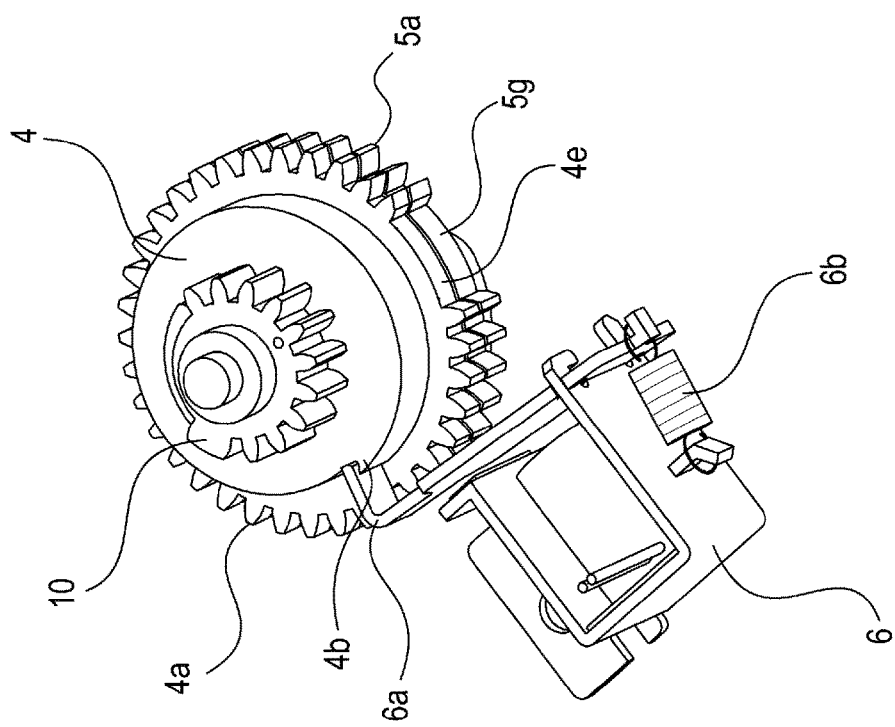

Next, in FIG. 4, (a) and (b) are perspective views for illustrating a positional relationship between the trigger gear 4 and the solenoid 6, in which (a) is the perspective view showing a state in which the locking portion 4b of the trigger gear 4 is locked, and (b) is the perspective view showing a state in which the locking of the locking portion 4b of the trigger gear 4 is eliminated.

As shown in (a) of FIG. 4, the locking claw 6a of the solenoid 6 locks the locking portion 4b of the trigger gear 4 and the rotation of the trigger gear is limited (prevented), and the trigger gear portion 4a and the tooth-omitted trigger gear portion 4e are in the same phase positions as the follower gear portion 5a and the tooth-omitted follower gear portion 5g, respectively. Further, as shown in (b) of FIG. 4, when the solenoid 6 is energized and eliminates the locking of the locking portion 4b by the locking claw 6a, the trigger gear 4 rotates in the clockwise direction by a rotation motive force of the trigger gear spring 7 (FIG. 3). In this embodiment, as the amount of the play between the key portion 5f and the groove portion 4c, a gear of the trigger gear portion 4a is constituted so as to rotate in the rotational direction relative to a gear of the follower gear portion 5a in an amount corresponding to the 3 teeth thereof.

The torsion spring 8 includes, as shown in FIGS. 2 and 3, a fixed arm 8a fixed to an unshown fixing portion and a movable arm 8b which contacts the cam portion 5b of the follower gear 5 and which urges the cam portion 5b toward a center of the rotation shaft 5d of the follower gear 5, and is held (supported) by a spring supporting shaft 9. When the follower gear 5 is in a predetermined rotational phase, the follower gear 5 is urged so as to be rotated by urging the cam portion 5b thereof by an elastic force of the torsion spring 8. Even when the tooth-omitted follower portion 5g of the follower gear 5 oppose the driving gear 3 and the follower gear 5 cannot be supplied with a sufficient driving force from the driving gear 3, the follower gear 5 can be rotated by the urging with the torsion spring 8.

[Gear Pair DR1]

Figure 5:
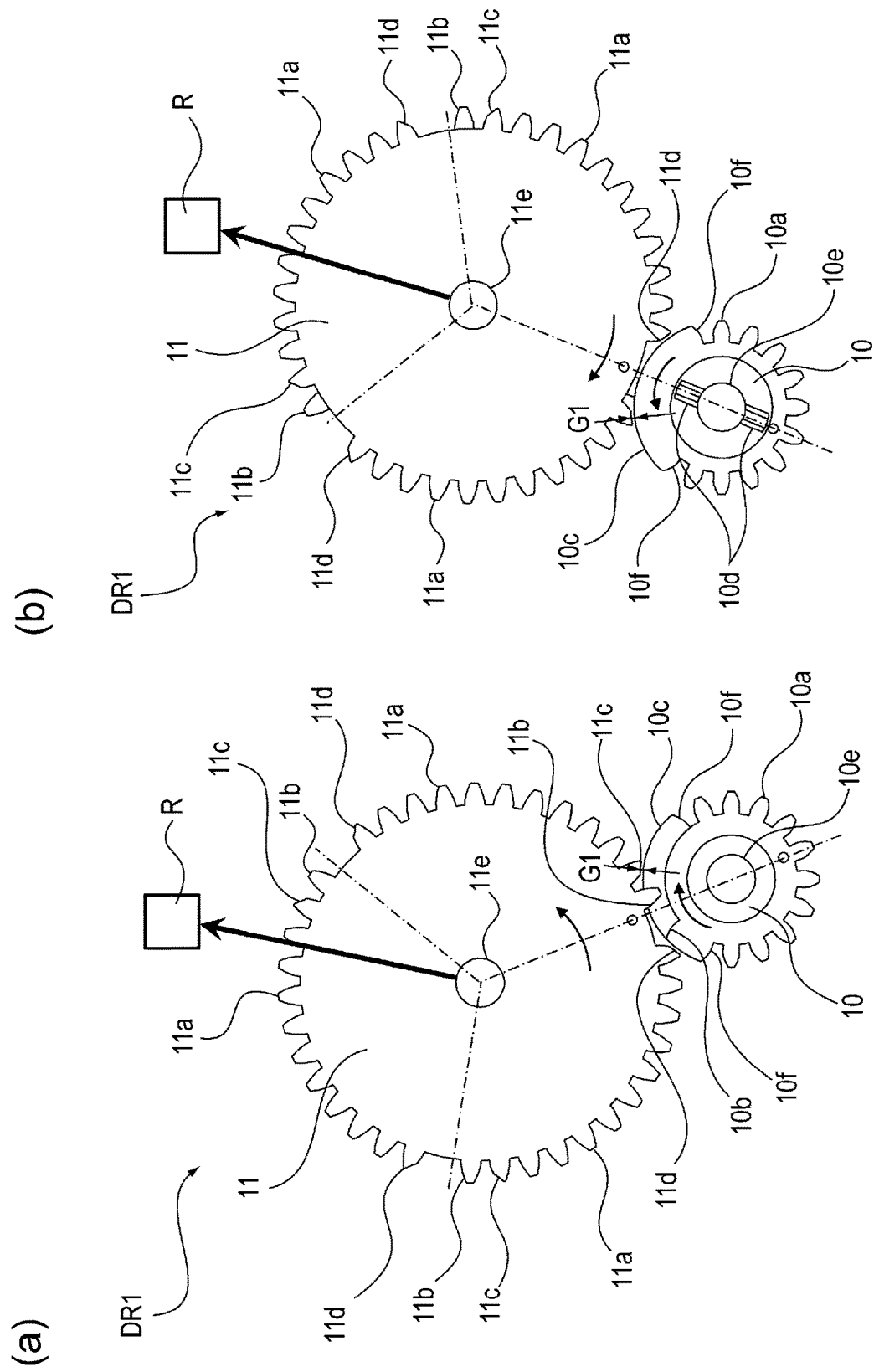
In FIG. 5, (a) is a schematic view of a gear pair DR1 as seen from a front side, and (b) is a schematic view of the gear pair DR1 as seen from a back side.
Figure 6:
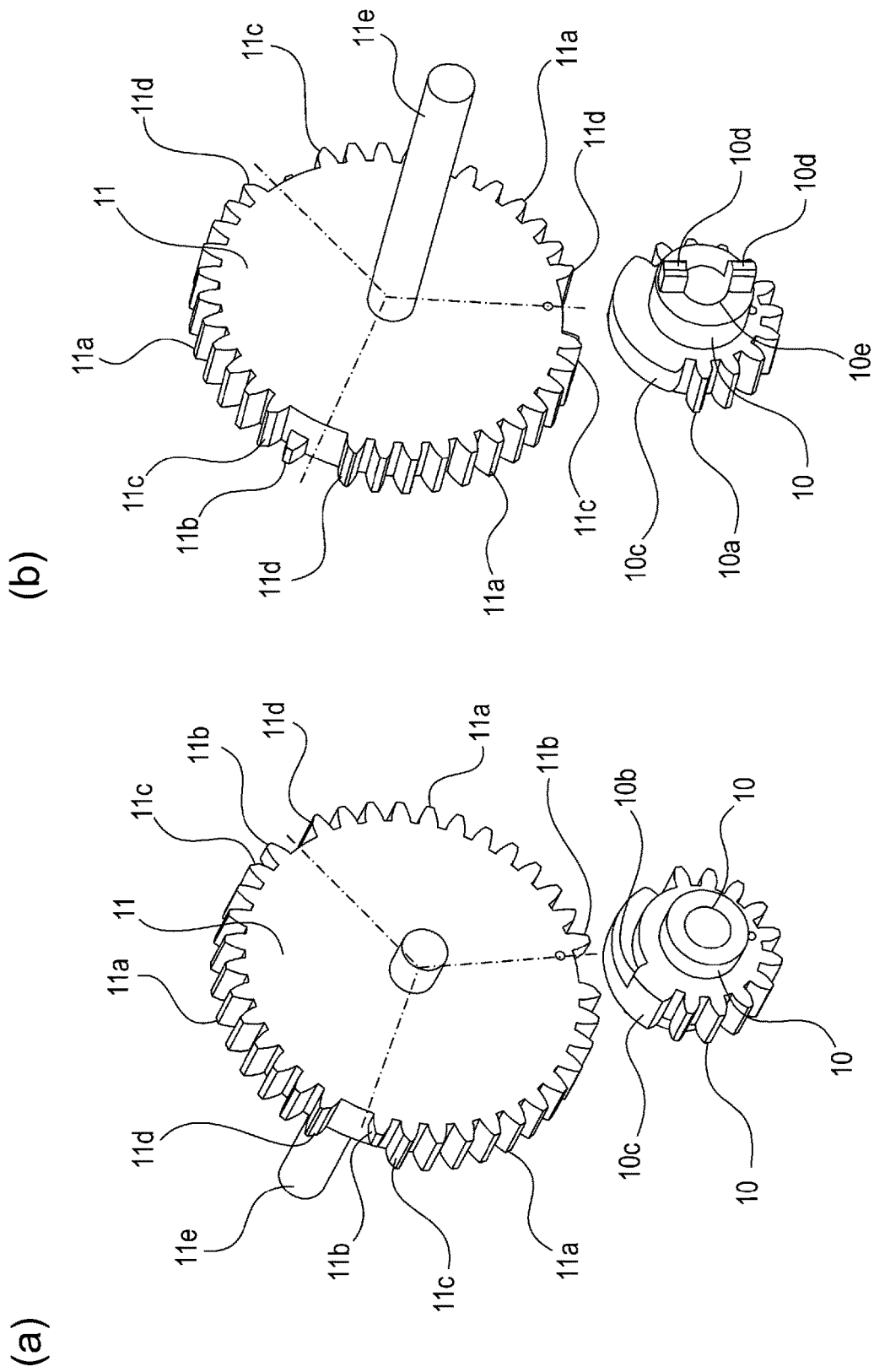
In FIG. 6, (a) is a perspective view of an intermittent input gear 10 and an intermittent output gear 11 as seen from a front side, and (b) is a perspective view of the intermittent input gear 10 and the intermittent output gear 11 as seen from a back side.

Next, a constitution of the gear pair DR1 of the clutch device CL1 will be described using FIGS. 3, 5 and 6. In FIG. 5, (a) and (b) are schematic views of the gear pair DR1, in which (a) is the schematic view of the gear pair DR1 as seen from the front side, and (b) is the schematic view of the gear pair DR1 as seen from the back side. In FIG. 6, (a) and (b) are perspective views of the intermittent input gear 10 and the intermittent output gear 11 in the gear pair DR1, in which (a) is the perspective view of these gears as seen from the front side, and (b) is the perspective view of these gears as seen from the back side.

The intermittent input gear 10 includes, as shown in (b) of FIG. 3, FIG. 5 and FIG. 6, a first input gear portion 10a and a second input gear portion 10b which are configured to drive the intermittent output gear 11, and a limiting portion 10c for limiting rotation of the intermittent output gear 11. The intermittent input gear 10 further includes a projected connecting portion 10d engaging with the recessed connecting portion 5e of the follower gear 5, and a bearing portion 10e. The second input gear portion 10b is adjacent to the limiting portion 10c with respect to a facewidth direction. The intermittent input gear 10 is supported at the bearing portion 10e on the rotation shaft 5d of the follower gear 5, and is connected coaxially with the follower gear 5, so that the intermittent input gear 10 rotates together with the follower gear 5 when the follower gear 5 rotates by engagement with the driving gear 3.

In this embodiment, the first input gear portion (first driving portion) 10a and the second input gear portion (second driving portion) 10b are gears of the same module. In this embodiment, the first input gear portion 10a and the second input gear portion 10b have the tooth-number diameter corresponding to 16 teeth, and the toothed portion forming the first input gear portion 10a is constituted by 10 teeth.

The limiting portion 10c has a convex arcuate shape which is concentrical with a rotation center of the intermittent input gear 10 and which has a diameter equal to an addendum circle diameter of the intermittent input gear 10. A rotational direction width of a limiting surface (convex arcuate surface) of the limiting portion 10c contacting contact portions 11c, 11d of the intermittent output gear 11 described later is constituted correspondingly to 6 teeth of the first input gear portion 10a. At each of end portions of the limiting portion 10c with respect to a rotational direction, a tooth surface 10f having the same module as the first input gear portion 10a. A shape formed by a tooth top of the tooth surface 10f and the limiting surface (convex arcuate surface) of the limiting portion 10c is a convex shape which does not protrude from a shape formed by the limiting surface (convex arcuate surface) and a curve (involute curve) of the tooth surface 10f. That is, a crossing portion connecting the tooth surface 10f and the convex arcuate surface of the limiting portion 10c is smoothly formed. As a result, the tooth top of the tooth surface 10f and the limiting surface (convex arcuate surface) of the limiting portion 10c of the intermittent input gear 10 continuously contacts the opposing intermittent output gear 11 and rotate smoothly. A phase arrangement of the second input gear portion 10b and the tooth surface 10f is the same as the phase arrangement of the tooth surface of the first input gear portion 10a.

The intermittent output gear 11 is, as shown in FIGS. 5 and 6, provided with a first output gear portion 11a engageable with the first input gear portion 10a, a second output gear portion 11b engageable with the second input gear portion 10b, and the contact portions 11c, 11d contacting the limiting portion 10c at each of three positions. The intermittent output gear 11 is provided with a rotation shaft 11e, and the rotation shaft 11e is connected with the driven member R.

In this embodiment, the first output gear portion (first driven portion) 11a and the second output gear portion (second driven portion) 11b are gears of the same module. In this embodiment, the first output gear portion 11a and the second output gear portion 11b have the tooth-number diameter corresponding to 39 teeth, and the toothed portion forming the first output gear portion 11a is constituted by 33 teeth, and the toothed portion forming the second output gear portion 11b is constituted by a single tooth at each of the three positions.

The contact portions contacting the limiting portion 10c a constituted by a downstream contact portion 11c provided in a downstream side of the intermittent output gear 11 with respect to the rotational direction and an upstream contact portion 11d provided in an upstream side of the intermittent output gear 11 with respect to the rotational direction, and are formed at a part of the top of the tooth surface of the first output gear portion 11a. In this embodiment, a shape of each of the downstream contact portion 11c and the upstream contact portion 11d is formed in a concave arcuate shape (concave arcuate surface) so as to extend along the limiting surface (convex arcuate surface) of the limiting portion 10c. The shape of each of the downstream contact portion 11c and the upstream contact portion 11d is concentrical with the limiting portion 10c and is constituted by a diameter which is somewhat larger than the diameter of the limiting portion 10c by adding the arcuate surface gap G1 to the limiting portion 10c. The number of teeth between the downstream contact portion 11c and the upstream contact portion 11d including the teeth formed as the downstream contact portion 11c and the upstream contact portion 11d corresponds to 4 teeth.

The second output gear portion 11b is positioned between the downstream contact portion 11c and the upstream contact portion 11d and is constituted in the same phase arrangement as the first output gear portion 11a, and is disposed adjacently to the tooth formed as the downstream contact portion 11c. A width of the gear of the second output gear portion 11b with respect to a rotational axis direction is smaller than the facewidth of the first output gear portion 11a so as to engage with the second input gear portion 10b.

The intermittent input gear 10 and the intermittent output gear 11 are assembled in relative rotational phase with each other so that the limiting portion 10c and the downstream and upstream contact portions 11c, 11d extend along each other. Further, the limiting portion 10c, the downstream contact portion 11c and the upstream contact portion 11d are formed of a material with a small frictional coefficient so that the limiting portion 10c can easily slide with the downstream contact portion 11c and the upstream contact portion 11d. Further, in order to improve a sliding property, as desired, a lubricant such as grease may also be applied between the limiting portion 10c and the downstream and upstream contact portions 11c, 11d.

[Operation of Clutch Device CL1]

Figure 7:
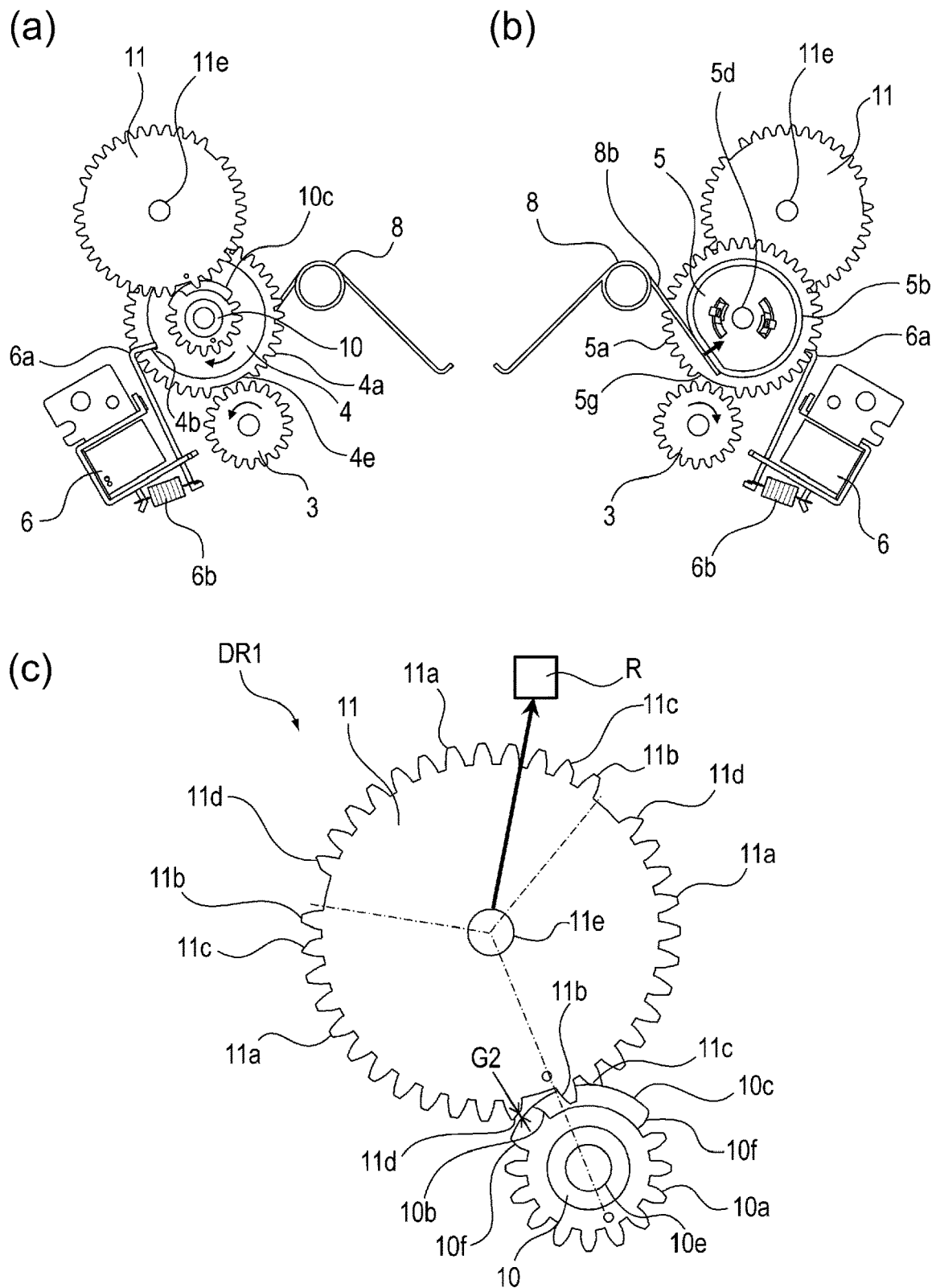
In FIG. 7, (a) is a schematic view of the clutch device CL1 as seen from the front side, (b) is a schematic view of the clutch device CL1 as seen from the back side, and (c) is a schematic view of the gear pair DR1 as seen from the front side.
Figure 8:
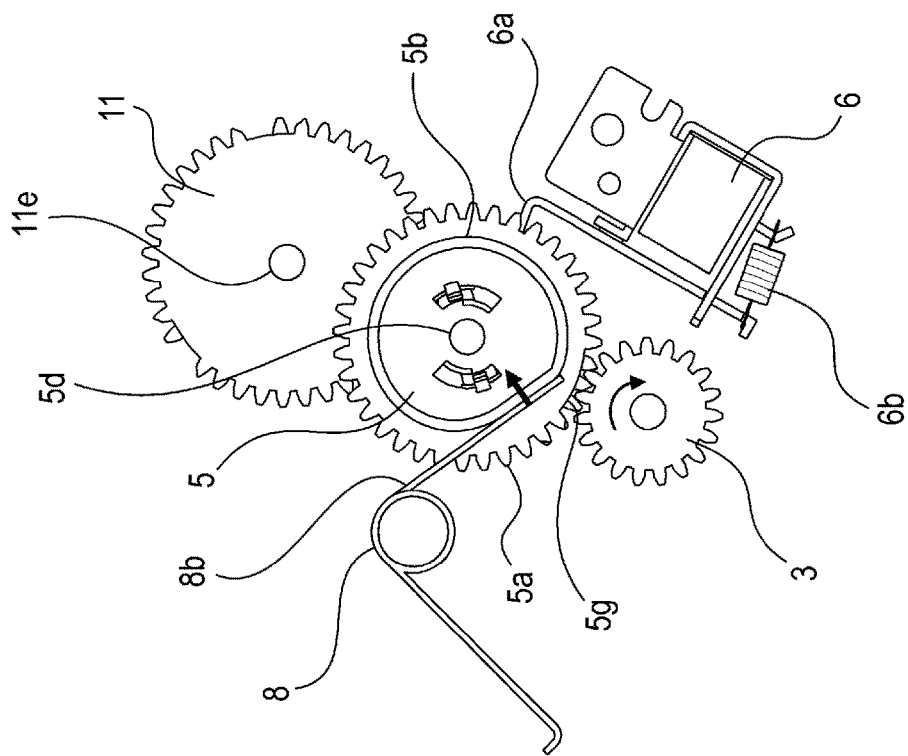
In FIG. 8, (a) is a schematic view of the clutch device CL1 as seen from the front side, and (b) is a schematic view of the clutch device CL1 as seen from the back side.
Figure 8:
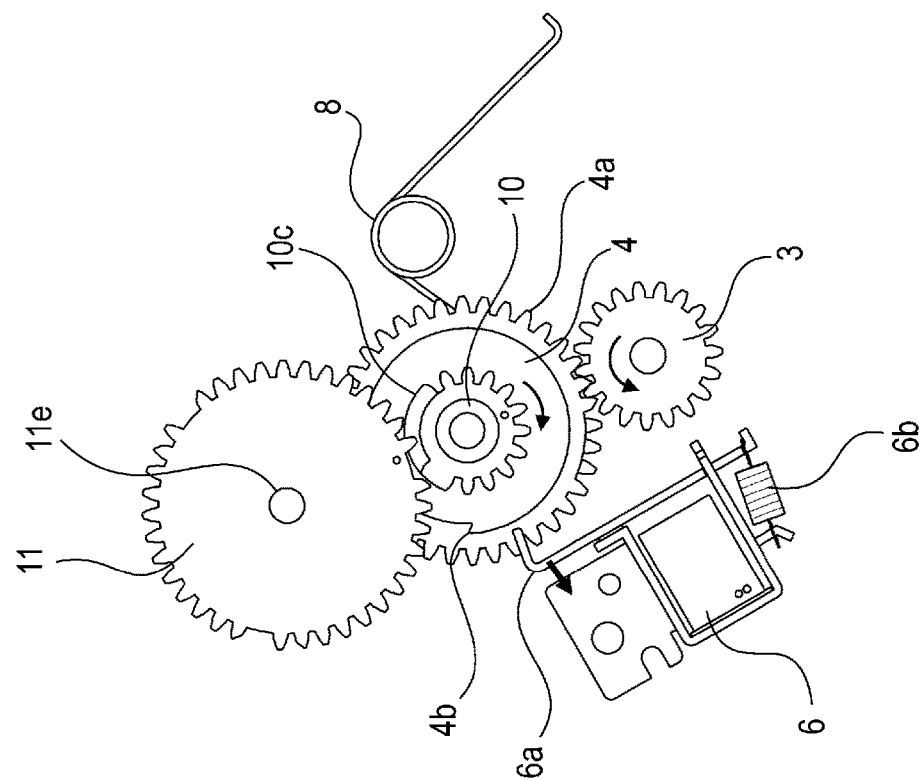
Figure 9:
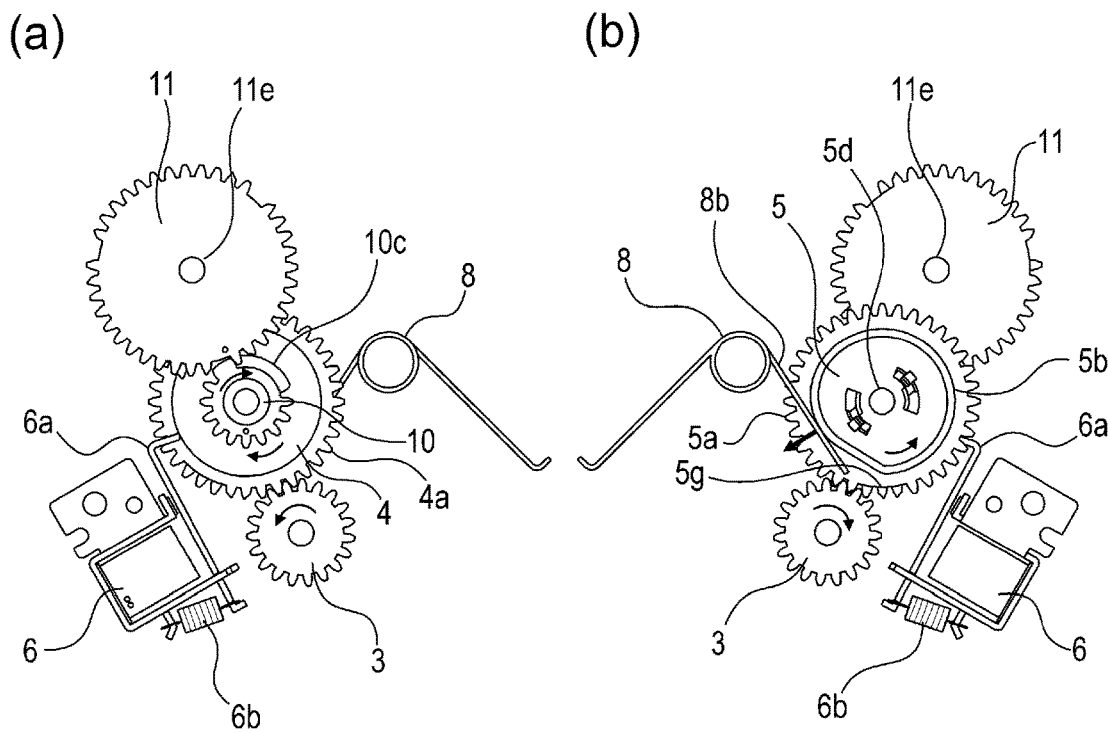
In FIG. 9, (a) is a schematic view of the clutch device CL1 as seen from the front side, (b) is a schematic view of the clutch device CL1 as seen from the back side, and (c) is a schematic view of the gear pair DR1 as seen from the front side.
Figure 9:
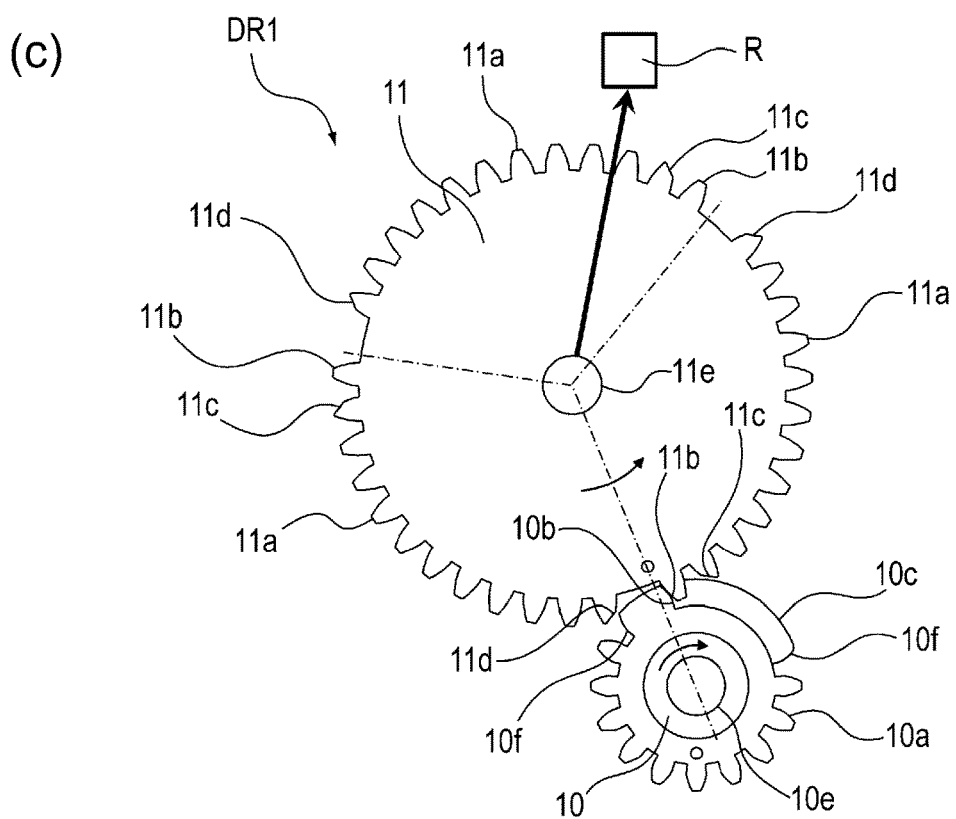
Figure 10:
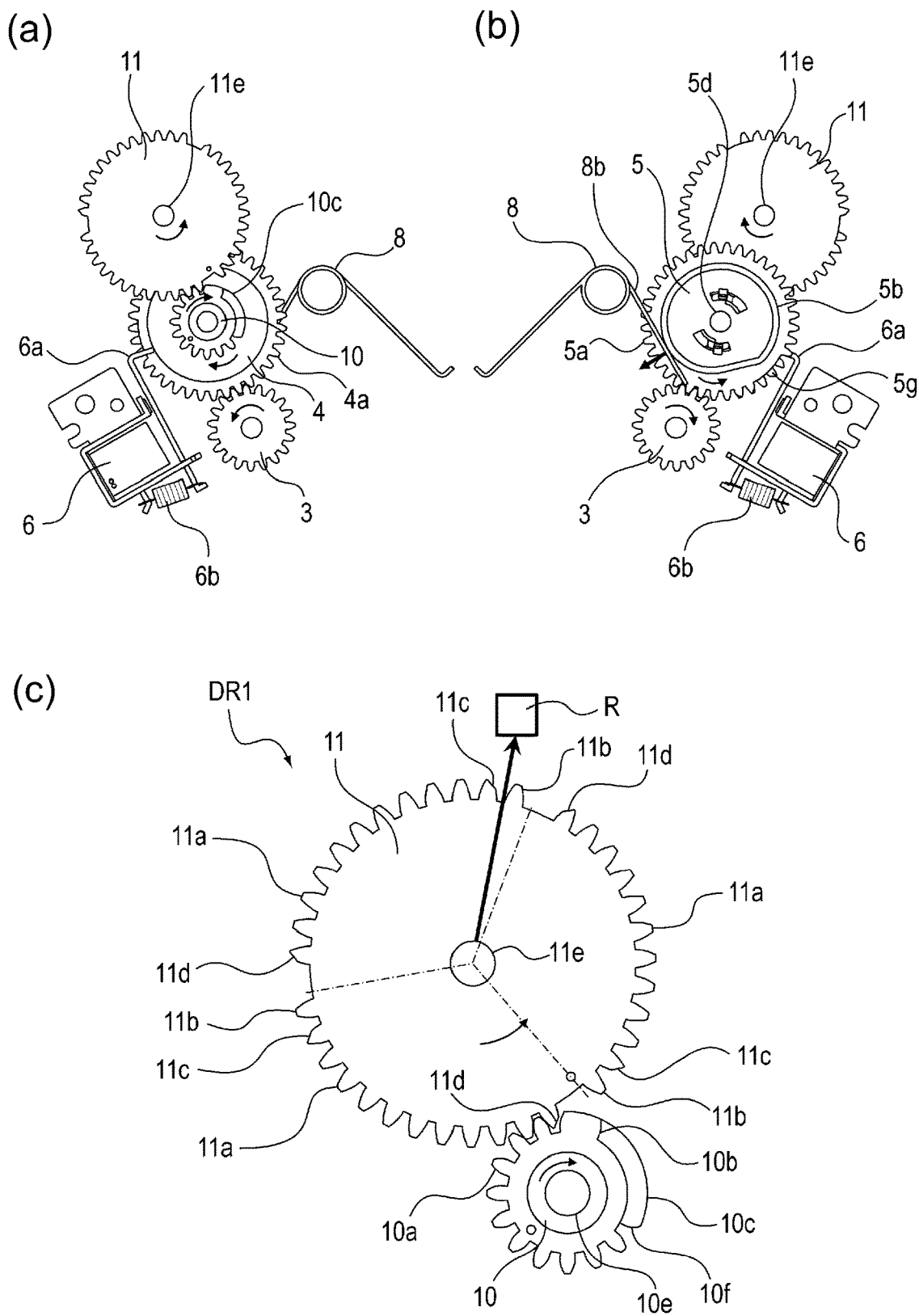
In FIG. 10, (a) is a schematic view of the clutch device CL1 as seen from the front side, (b) is a schematic view of the clutch device CL1 as seen from the back side, and (c) is a schematic view of the gear pair DR1 as seen from the front side.
Figure 11:
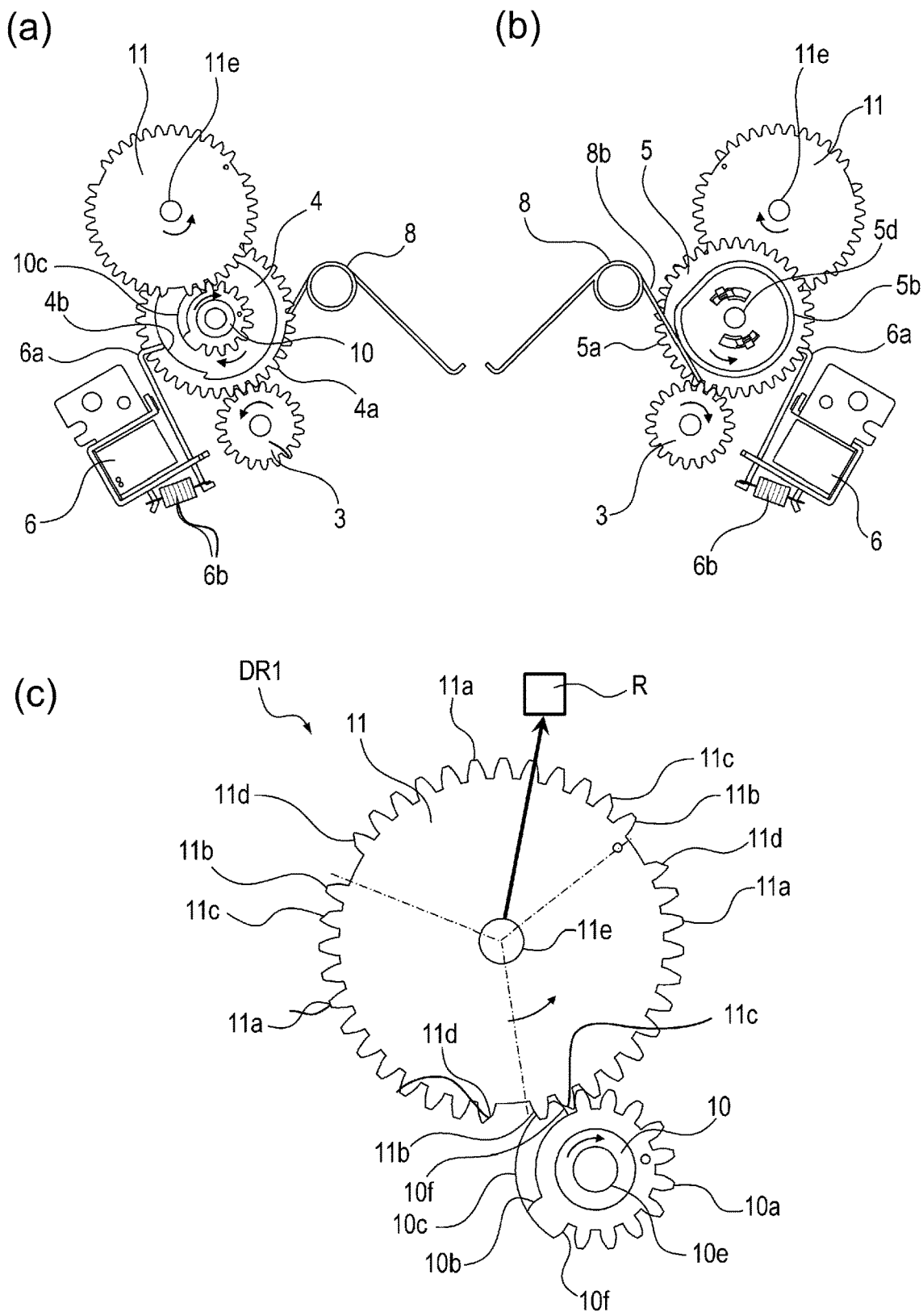
In FIG. 11, (a) is a schematic view of the clutch device CL1 as seen from the front side, (b) is a schematic view of the clutch device CL1 as seen from the back side, and (c) is a schematic view of the gear pair DR1 as seen from the front side.
Figure 12:
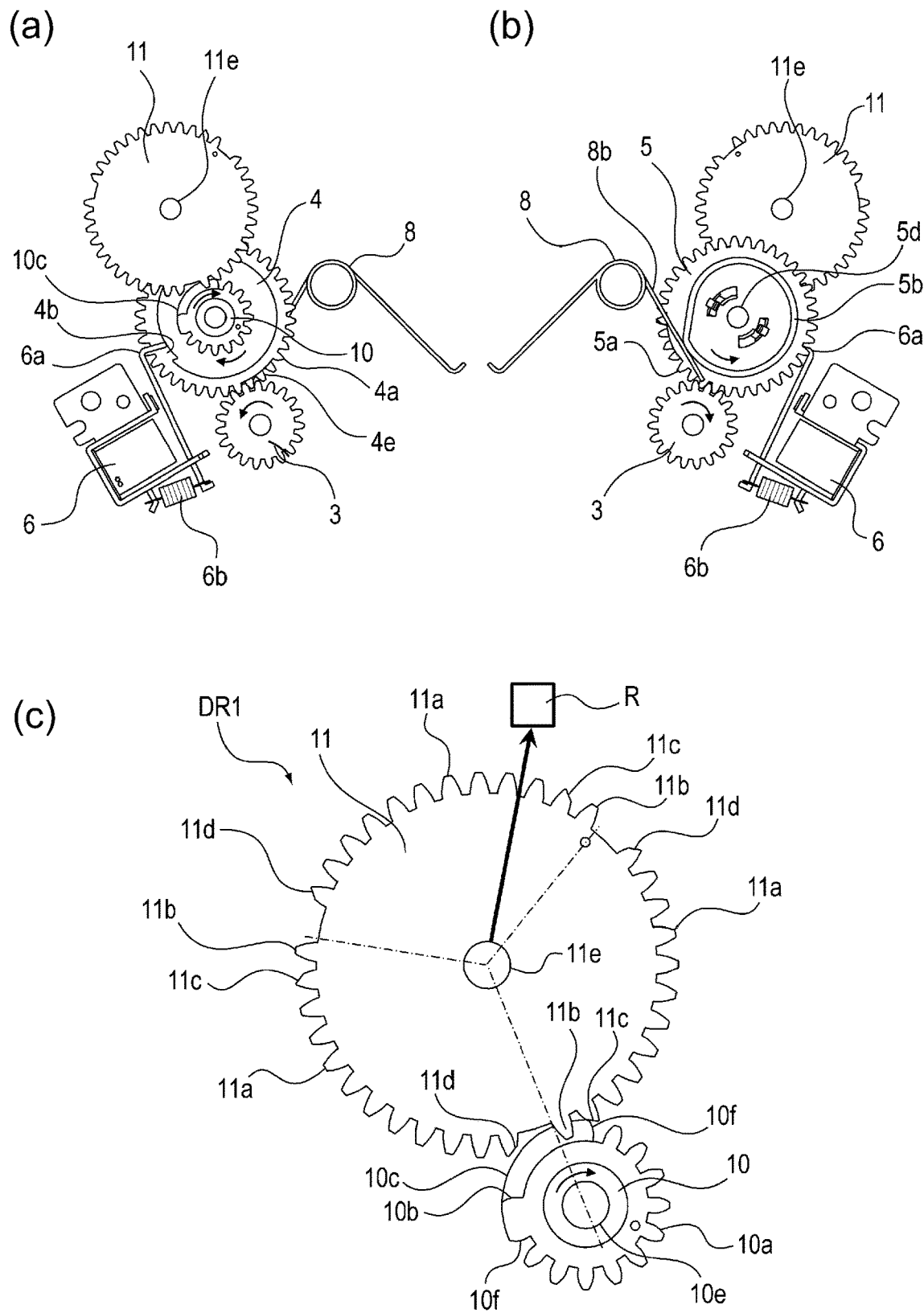
In FIG. 12, (a) is a schematic view of the clutch device CL1 as seen from the front side, (b) is a schematic view of the clutch device CL1 as seen from the back side, and (c) is a schematic view of the gear pair DR1 as seen from the front side.
Figure 13:
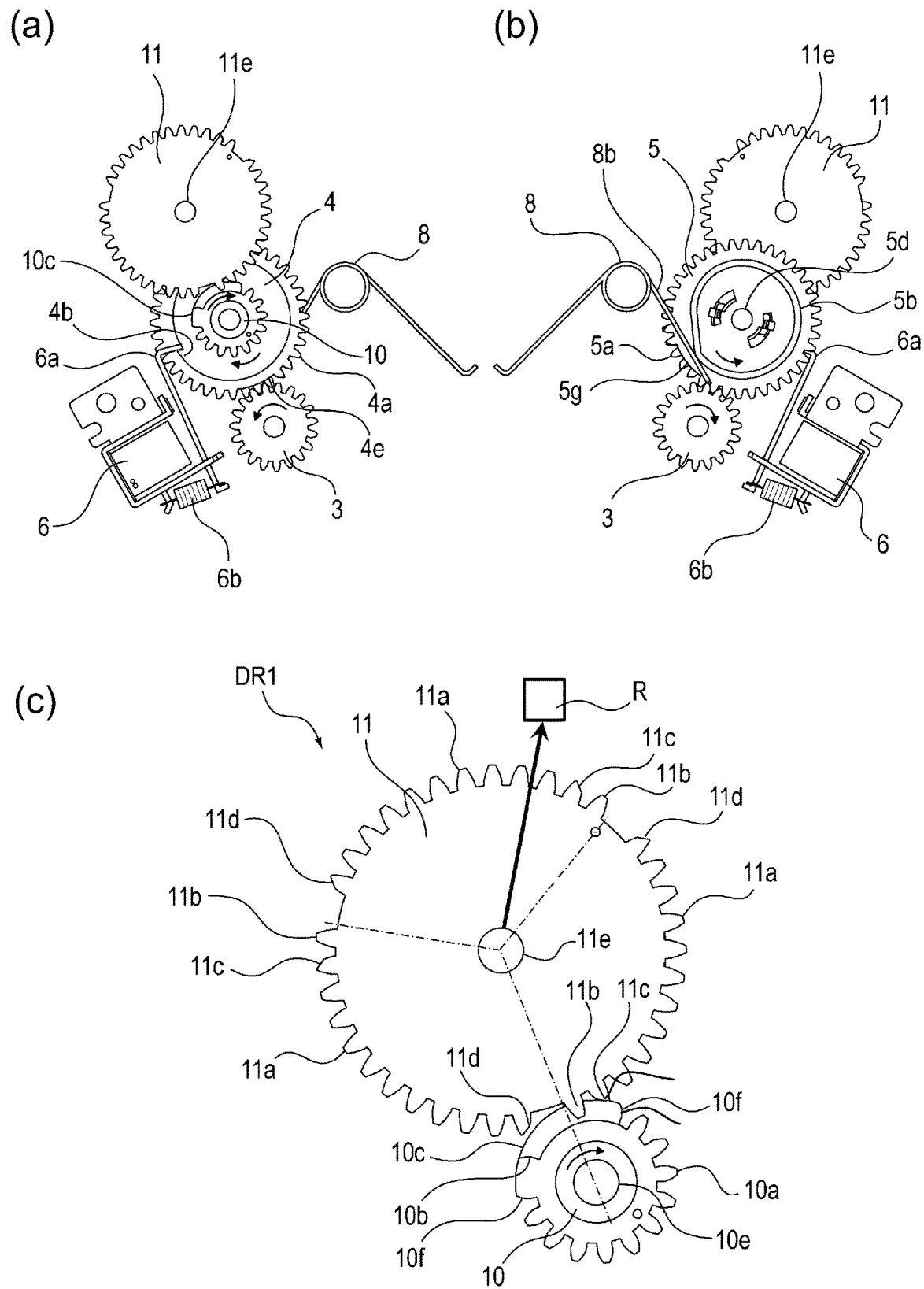
In FIG. 13, (a) is a schematic view of the clutch device CL1 as seen from the front side, (b) is a schematic view of the clutch device CL1 as seen from the back side, and (c) is a schematic view of the gear pair DR1 as seen from the front side.
Figure 14:
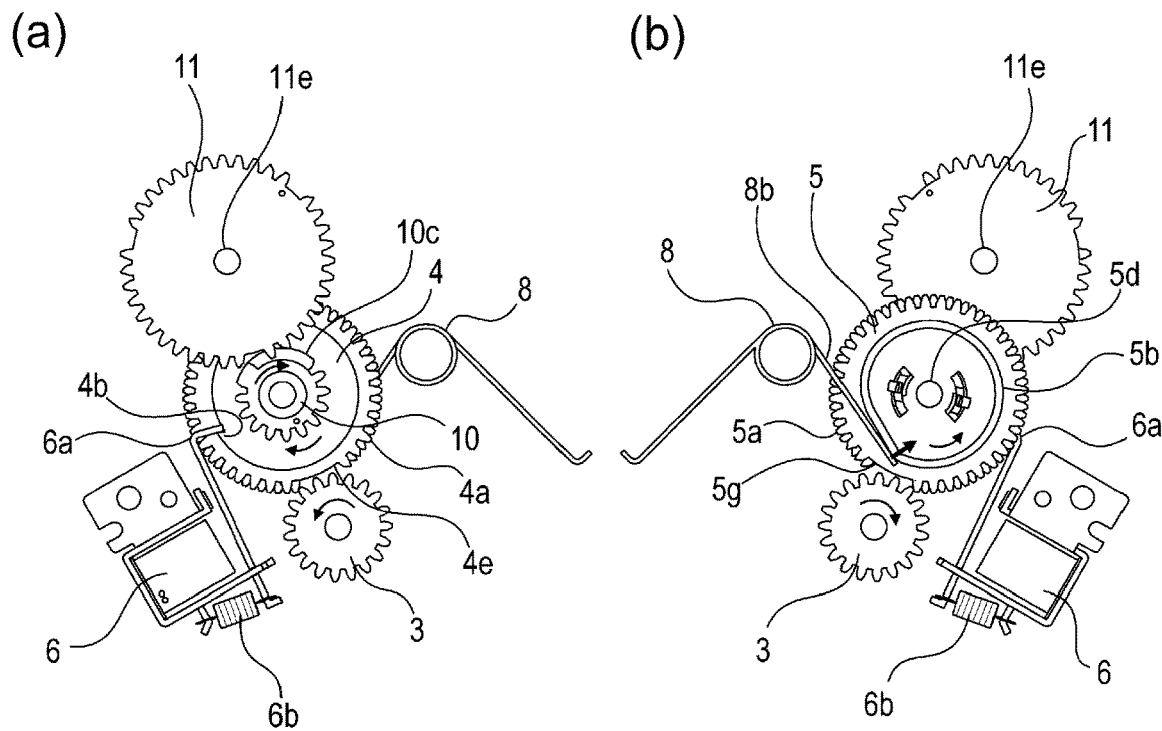
In FIG. 14, (a) is a schematic view of the clutch device CL1 as seen from the front side, (b) is a schematic view of the clutch device CL1 as seen from the back side, and (c) is a schematic view of the gear pair DR1 as seen from the front side.

A drive transmitting operation of the clutch device CL1 will be described with reference to FIGS. 7 to 14. In FIG. 7, (a) to (c) show a standby state of the clutch device CL1. In FIG. 8, (a) and (b) show an operation start state of the clutch device CL1. In FIG. 9, (a) to (c) show the time of rotation start. In FIG. 10, (a) to (c) show the time of drive transmission start of the clutch device CL1. In FIG. 11, (a) to (c) shows the time immediately before drive transmission end of the clutch device CL1. In FIG. 12, (a) to (c) show the time of the drive transmission end of the clutch device CL1. In FIG. 13, (a) to (c) show the time of rotation end of the trigger gear 4 of the clutch device CL1. In FIG. 14, (a) to (c) show the time immediately before the follower gear 5 of the clutch device CL1 reaches a home position.

In each of FIGS. 7-14, (a) is a schematic view of the clutch device CL1 as seen from the front side (trigger gear side), (b) is a schematic view of the clutch device CL1 as seen from the back side (follower gear side), and (c) (which is not included in FIG. 8) is a schematic view of the gear pair DR1 as seen from the front side. Rotational directions and operational directions of the respective constituent members in FIGS. 7-14 are as shown by arrows indicated in the respective constituent members.

In the stand-by state of the clutch device CL1, as shown in (b) of FIG. 7, the movable arm 8b contacts a flat surface portion of the cam portion 5b and urges the flat surface portion toward the center of the rotation shaft 5d. In this state, an urging force of the movable arm 8b does not act as rotation moment, and the follower gear 5 is in the home position, so that the tooth-omitted follower portion 5g opposes the driving gear 3 and therefore a driving force is not transmitted from the driving gear 3 to the follower gear 5.

Further, as shown in (a) of FIG. 7, the trigger gear 4 urged by the trigger spring 7 (FIG. 3) so as to rotate in the clockwise direction but is at rest by locking the locking portion 4b of the trigger gear 4 with the locking claw 6 of the solenoid 6. At this time, also the tooth-omitted trigger portion 4e is in a home position opposing the driving gear 3, so that the driving force of the driving gear 3 is not transmitted to the trigger gear 4.

As shown in (c) of FIG. 7, the limiting portion 10c of the intermittent input gear 10 of the gear pair DR1 is in a position opposing the downstream contact portion 11c and the upstream contact portion 11d of the intermittent output gear 11. In this state, rotation of the intermittent output gear 11 is limited (prevented), and therefore even when the intermittent output gear 11 receives the rotation torque from the driven member R at the rotation shaft 11e which is an output destination of the driving force, the intermittent output gear 11 cannot rotate. This state corresponds to the home position of the intermittent output gear 11.

When the intermittent output gear 11 is in the home position, the intermittent output gear 11 is in one-side contact state in which the downstream contact portion 11c contacts the limiting portion 10c but the upstream contact portion 11d does not contact the limiting portion 10c. An arcuate surface gap G2 at this time is larger than the arcuate surface gap G1 (G2>G1). However, the position of the second output gear portion 11b approaches a line connecting rotation centers of the intermittent input gear 10 and the intermittent output gear 11 by the arcuate surface gap G2. Further, when the arcuate surface gap G2 becomes larger, the position of the second output gear portion 11b more approaches the line. That is, the second output gear portion 11*b* is positioned between the line connecting the rotation centers of the intermittent input gear 10 and the intermittent output gear 11 and the downstream contact portion 11*c* in a state in which the limiting portion 10*c* and the contact portion 11*c* oppose each other. Accordingly, the tooth top of the second input gear portion 11*b* approaches a rotation locus of the tooth top of the second input gear portion 10*b*, so that an amount of engagement between the second input gear portion 10*b* and the second output gear portion 11*b* becomes large.

In order to carry out the drive transmitting operation by the clutch device CL1, first, the trigger gear 4 is rotated. For this purpose, as shown in (a) of FIG. 8, the solenoid 8 is energized and the locking claw 6*a* is retracted from the trigger gear 4, so that locking of the locking portion 4*b* by the locking claw 6*a* is eliminated (released). Then, as described above, the trigger gear 4 starts rotation in the clockwise direction (arrow direction in FIG. 8) by the elastic force of the trigger spring 7 (FIG. 3). At this time, the follower gear 5 does not rotate since the rotation of the cam portion 5*b* is limited (prevented) by urging of the cam portion 5*b* by the torsion spring 8.

When the trigger gear 4 rotates in a predetermined amount, the trigger gear portion 4*a* and the driving gear 3 engage with each other, so that the trigger gear 4 receives the driving force from the driving gear 3 and thus rotates. Further, as described above, the follower gear 5 is maintained at the home position by the urging force of the movable arm 8*b* until the trigger gear portion 4*a* of the trigger gear 4 rotates in an amount corresponding to 3 teeth relative to the follower gear portion 5*a*. Accordingly, in a period in which the follower gear 5 is at rest, similarly as in the state of (c) of FIG. 7, the downstream contact portion 11*c* of the intermittent output gear 11 contacts the limiting portion 10*c* of the intermittent input gear 10, so that the intermittent output gear 11 is at rest at the home position without rotating.

The follower gear 5 of the clutch device CL1 starts rotation when the trigger gear portion 4*a* rotates in an amount corresponding to 3 teeth relative to the gear of the follower gear portion 5*a* as shown in (a) of FIG. 9. Here, the amount corresponding to 3 teeth is the above-described amount of the play between the key portion 5*f* of the follower gear 5 and the groove portion of the trigger gear 4 (FIG. 3). Thereafter, the follower gear portion 5*a* and the driving gear 3 engage with each other, so that the driving force is transmitted from the driving gear 3 to the follower gear 5. When the follower gear 5 starts rotation, the intermittent input gear 10 does not rotate the intermittent output gear 11, and the convex arcuate surface of the limiting portion 10*c* rotates while sliding with the downstream contact portion 11*c* of the intermittent output gear 11.

When the intermittent input gear 10 rotates in a predetermined amount, as shown in (c) of FIG. 9, the tooth of the second input gear portion 10*b* of the intermittent input gear 10 engages with the second output gear portion 11*b* of the intermittent output gear 11, and starts the rotation of the intermittent output gear 11.

Thus, the second input gear portion 10*b* and the second output gear portion 11*b* are teeth for causing the intermittent output gear 11 to start rotation again from an intermittent operation state, and as described above, the second input gear portion 10*b* can engage with the second output gear portion 11*b* with reliability.

Specifically, an engagement amount of engagement between the tooth of the second input gear portion 10*b* and the tooth of the second output gear portion 11*b* is substantially equal to an engagement amount between the first input gear portion 10*a* and the first output gear portion 11*a*. When accuracy of a distance between the rotation centers of the intermittent input gear 10 and the intermittent output gear 11 is such that these gears can engage with each other and can rotate, the second input gear portion 10*b* can engage and mesh with the second output gear portion 11*b* with reliability.

Incidentally, after the locking of the locking portion 4*b* is eliminated and the trigger gear 4 rotates, as shown in (a) of FIG. 9, energization to the solenoid 6 is stopped. For this reason, the locking claw 6*c* moves in a direction approaching the trigger gear 6*b* by the return spring 6*b*, so that the locking claw 6*a* causes the locking portion 4*b* to be in a stand-by state at a lockable position.

The drive transmission of the clutch device CL1 is, as shown in (a) and (c) of FIG. 10, started by rotating the intermittent output gear 11 in the counterclockwise direction through engagement between the first input gear portion 10*a* of the intermittent input gear 10 and the first output gear portion 11*a* of the intermittent output gear 11 with the rotation of the follower gear 5. Thus, by the rotation of the intermittent output gear 11, the driving force from the driving source M is transmitted to the driven member R via the rotation shaft 11*e*.

Further, as shown in (b) of FIG. 10, during the rotation of the follower gear 5 in engagement with the driving gear 3, the cam portion 5*b* urges the movable arm 8*b* against the elastic force of the torsion spring 8, so that the torsion spring 8 is compressed and charges the elastic force.

Immediately before the end of the drive transmission of the clutch device CL1, as shown in (a) and (c) of FIG. 11, the tooth surface 10*f* of the intermittent input gear 10 engages and mesh with the tooth surface of the first output gear portion 11*a* where the downstream contact portion 11*c* of the intermittent output gear 11 is formed.

At the time of the end of the drive transmission of the clutch device CL1, as shown in (a) and (c) of FIG. 12, when the intermittent input gear 10 is further rotated with the rotation of the follower gear 5, the convex arcuate surface of the limiting portion 10*c* contacts and slides with the downstream contact portion 11*c*. At this time, the intermittent output gear 11 is positioned at the home position where the limiting portion 10*c* and the downstream and upstream contact portions 11*c*, 11*d* oppose each other, so that the rotation thereof stops. By the stop of the rotation of the intermittent output gear 11, the driving force toward the driven member R is not transmitted from the intermittent output gear 11.

Thus, at the same time of the end of engagement of the tooth surface 10*f* of the intermittent input gear 10 with the first output gear portion 11*a* where the downstream contact portion 11*c* of the intermittent output gear 11 is formed, the downstream contact portion 11*c* smoothly contacts the limiting portion 10*c*. As a result, the intermittent output gear 11 is not reversely rotated by a driving load of the driven member R, so that the limiting portion 10*c* can slide with the downstream contact portion 11*c*.

Immediately before the trigger gear 4 rotates, the tooth-omitted trigger portion 4*e* opposes the driving gear 3 and the trigger gear portion 4*a* does not engage with the driving gear 3, and therefore the trigger gear 4 cannot receive the driving force from the driving gear 3. At this time, the follower gear 5 engages with the driving gear 3 and rotates, and therefore the trigger gear 4 is rotated by urging the follower gear 5 through the trigger spring 7.

Then, as shown in (a) of FIG. 13, at a place where the trigger gear 4 rotates one full turn, the locking portion 4b abuts against the locking claw 6a and is locked by the locking claw 6a, so that the trigger gear 4 stops at the home position. Incidentally, even at the time when the trigger gear 4 is stopped by being locked by the locking claw 6a, the follower gear 5 can rotate in an amount corresponding to 3 teeth of the follower gear portion 5a. Here, the amount corresponding to 3 teeth is the above-described amount of the play between the key portion 5f of the follower gear 5 and the groove portion of the trigger gear 4 (FIG. 3).

Further, as shown in (a) and (c) of FIG. 13, while the intermittent output gear 11 is kept at the home position, the convex arcuate surface of the limiting portion 10c rotates while sliding with the downstream contact portion 11c.

A state, immediately before the follower gear 5 reaches the home position, which is a state immediately before the operation of the clutch device CL1 is ended is, as shown in (b) of FIG. 14, a state immediately before the engagement between the follower gear portion 5a and the driving gear 3 is ended.

When the follower gear 5 further rotates from this state, the follower gear portion 5a cannot engage with the driving gear 3, so that the follower gear 5 cannot receive the driving force from the driving gear 3. At this time, the follower gear 5 stops before the tooth-omitted follower portion 5g moves to the position completely opposing the driving gear 3, and therefore there is a liability that noise generates due to slight collision between the rotating driving gear 3 and the tooth top of the follower gear portion 5a. In order to prevent the generation of the noise, the follower gear 5 is further rotated without relying on the driving force from the driving gear 3. Specifically, the follower gear 5 is rotated to the home position by urging the movable arm 8e against the cam portion 5b by the elastic force of the torsion spring 8, so that the tooth-omitted follower portion 5g is caused to completely oppose the driving gear 3. When the follower gear 5 rotates to the home position and is at rest at the home position, the clutch device CL1 is in the above-described stand-by state as shown in FIG. 7.

During the rotation of the follower gear 5 in the state in which the rotation of the trigger gear 4 stops, the trigger spring 7 (FIG. 3) mounted to the follower gear 5 is gradually urged, and therefore the elastic force is charged to the trigger spring 7. Accordingly, as shown in FIG. 8, when the locking of the locking portion 4b of the trigger gear 4 by the locking claw 6a of the solenoid 6 is eliminated, the trigger gear 4 can be rotated again by the elastic force of the trigger spring 7.

Further, as shown in (a) and (c) of FIG. 14, when the intermittent output gear 11 is in the home position and the follower gear 5 is rotated to the home position by the elastic force of the torsion spring 8, the convex arcuate surface of the limiting portion 10c rotates while sliding with the downstream contact portion 11c. Thus, an intermittent operation such that the limiting portion 10c and the downstream contact portion 11c contact each other before timing when the follower gear portion 5a does not engage with the driving gear 3, and the driving force of the follower gear 5 and the intermittent input gear 10 is not transmitted to the intermittent output gear 11 is performed.

Thus, in a period in which the follower gear 5 cannot receive the driving force from the driving gear 3 and is rotated by only the elastic force of the torsion spring 8, the follower gear 5 and the intermittent input gear 10 can keep the intermittent output gear 11 at a rest state. For this reason, the elastic force of the torsion spring 8 for rotating the follower gear 5 when the follower gear 5 cannot receive the driving force from the driving gear 3 may only be required to be a force to the extent that the force exceeds the sum of a rotational resistance force of the follower gear 5 alone such as a sliding friction resistance force between the limiting portion 10c and the downstream contact portion 11c, and a force for rotating the follower gear 5 in a predetermined amount against the elastic force of the trigger spring 7. By employing such a constitution, the elastic force of the torsion spring 8 can be made relatively small. Further, when the intermittent output gear 11 is positioned at the home position, the intermittent output gear 11 cannot rotate even when the intermittent output gear 11 receives the driving load from the driven member R positioned in a drive downstream side, so that the position of the intermittent output gear 11 can be limited.

As described above, according to this embodiment, a switching operation of engagement from between the second input gear portion 10b and the second output gear portion 11b to between the first input gear portion 10a and the first output gear portion 11a is carried out with no speed fluctuation since a gear module is the same.

The second input gear portion 10b is provided adjacently to the limiting portion 10c with respect to a facewidth direction, so that as described above, compared with the conventional constitution, the intermittent output gear 11 can be increased in an amount of engagement with the intermittent input gear 10 at the time of rotation start from the intermittent state.

Further, simultaneously with the end of engagement of the tooth surface 10f with the first output gear portion 11a where the downstream contact portion 11c of the intermittent output gear 11 is formed, the downstream contact portion 11c smoothly contacts the limiting portion 10c. For that reason, the intermittent output gear 11 is not reversely rotated by the driving load of the driven member R, so that the limiting portion 10c can slide with the downstream contact portion 11c.

By the constitution as described above, the distance between the rotation centers of the intermittent input gear 10 and the intermittent output gear 11 and the part accuracy such as the arcuate diameter of the limiting portion 10c and the downstream and upstream contact portions 11c, 11d can be alleviated compared with those in the conventional constitution. With the intermittent input gear 10 and the intermittent output gear 11, the gear module can be made small, so that it is possible to avoid increases in size and cost of the gear pair DR1.

Second Embodiment

A gear pair DR2 in Second Embodiment will be described with reference to FIGS. 15-22. In this embodiment, a general constitution of a clutch device CL is similar to that of the clutch device CL1 in First Embodiment, and therefore, members having the same functions as those in First Embodiment are represented by the same reference numerals or symbols and will be omitted from description.

[Gear Pair DR2]

Figure 15:
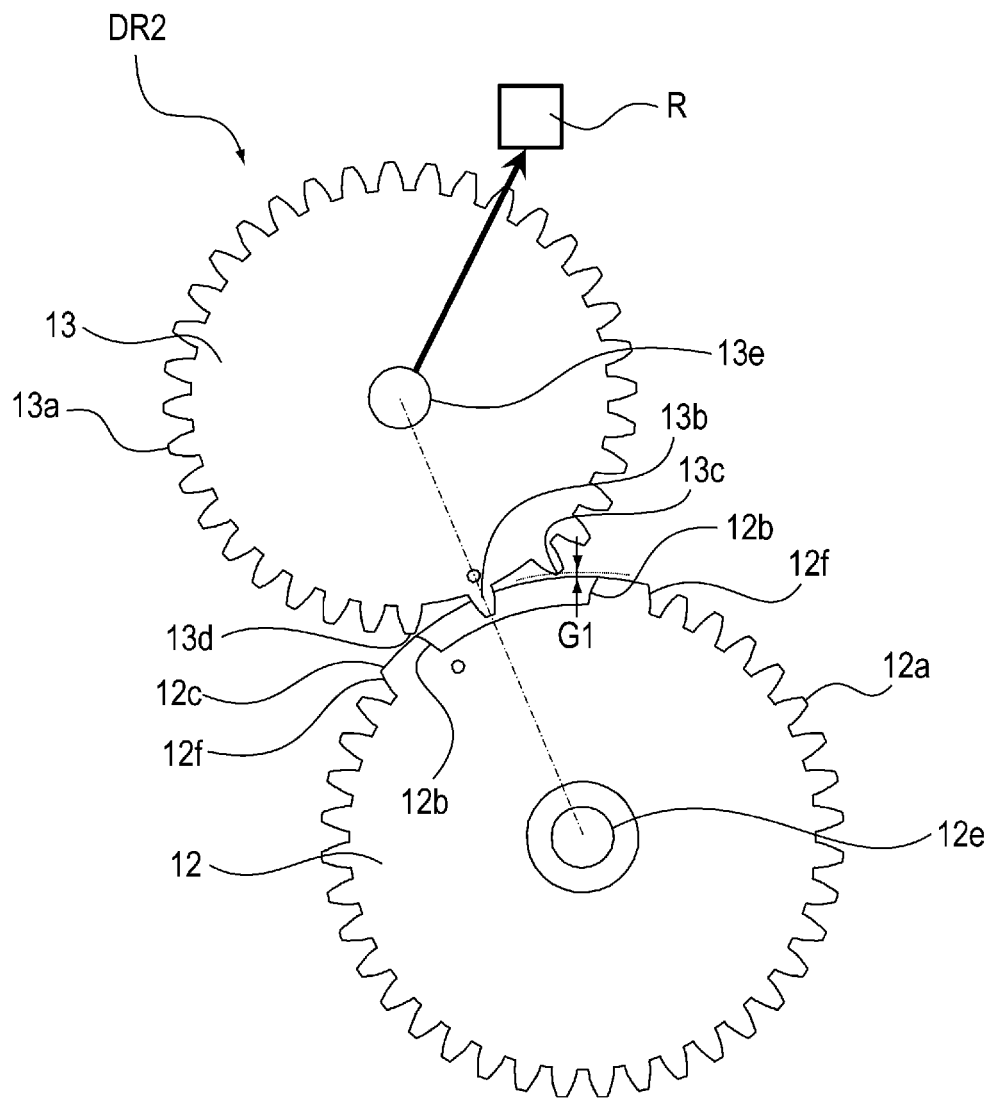
FIG. 15 is a schematic view of a gear pair DR2 as seen from a front side.
Figure 16:
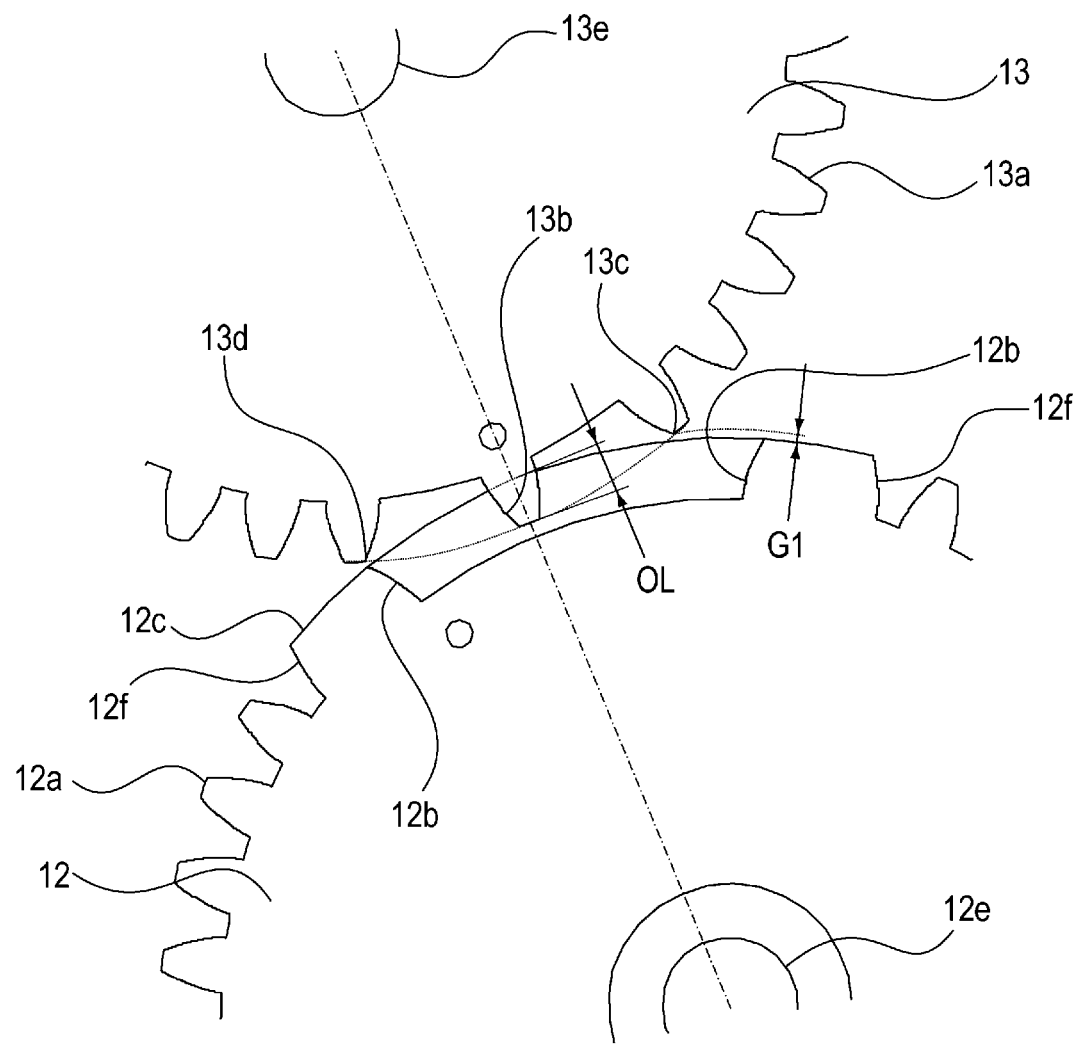
FIG. 16 is an enlarged view of the gear pair DR2 as seen from the front side.
Figure 17:
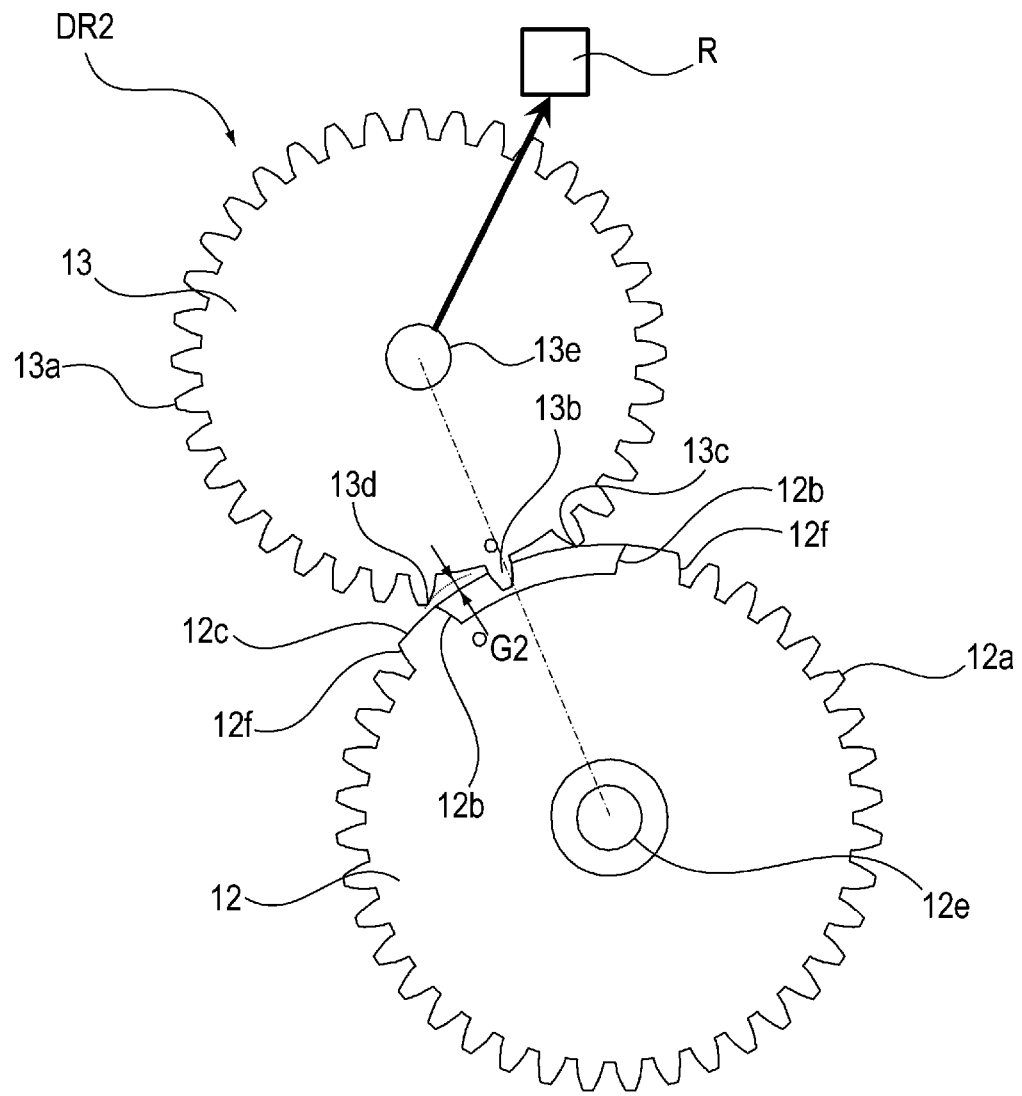
FIG. 17 is a schematic view of the gear pair DR2 in a stand-by state as seen from the front side.
Figure 18:
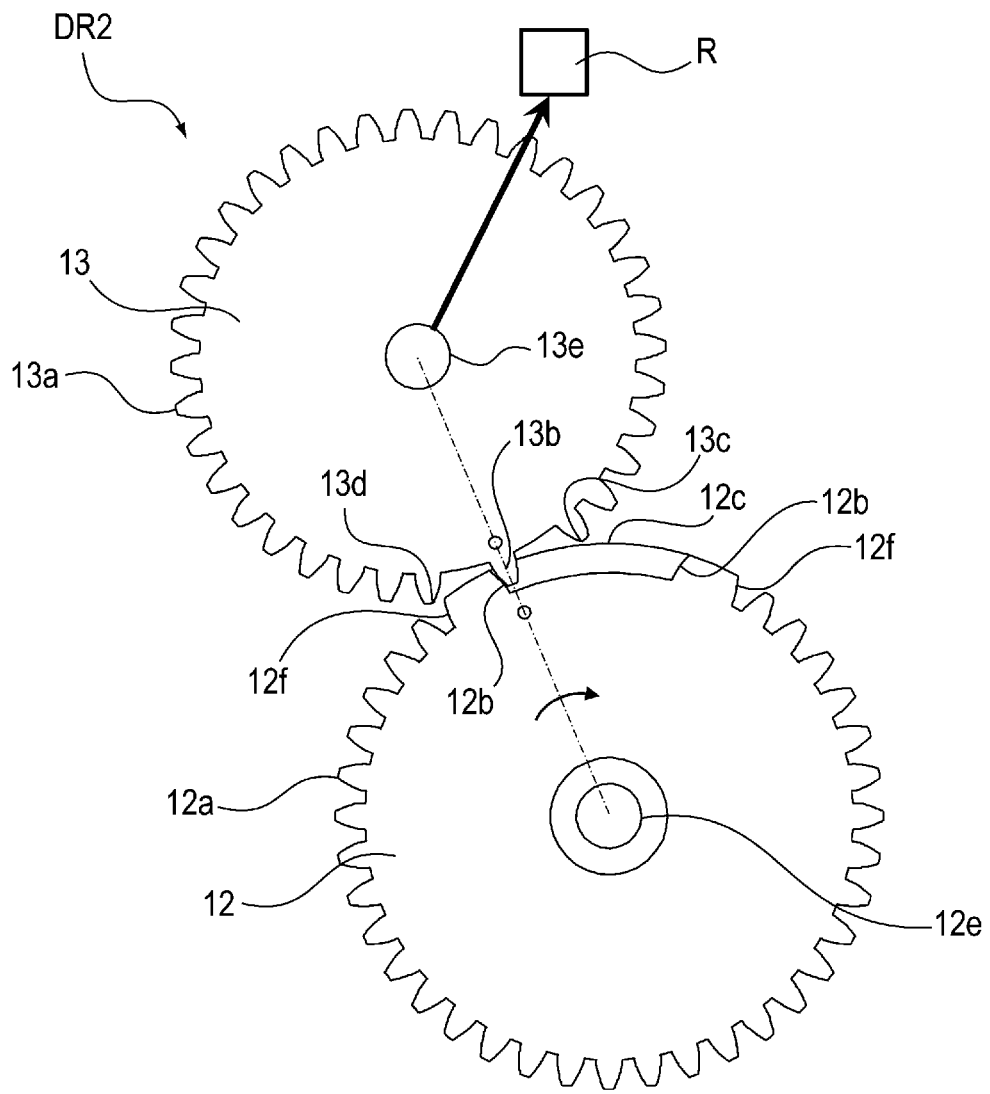
FIG. 18 is a schematic view of the gear pair DR2 at the time of a start of drive transmission as seen from the front side.
Figure 19:
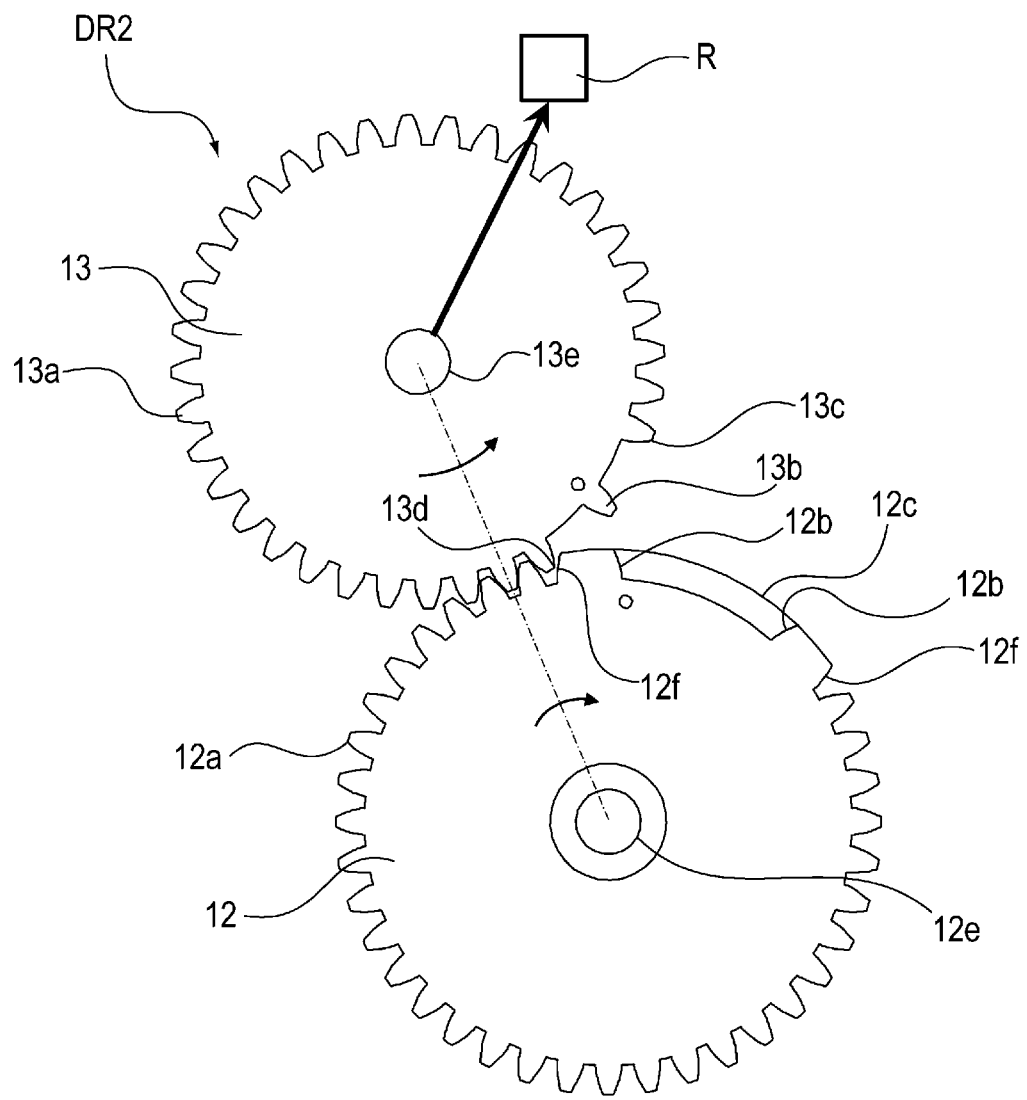
FIG. 19 is a schematic view of the gear pair DR2 in a drive transmission state as seen from the front side.
Figure 20:
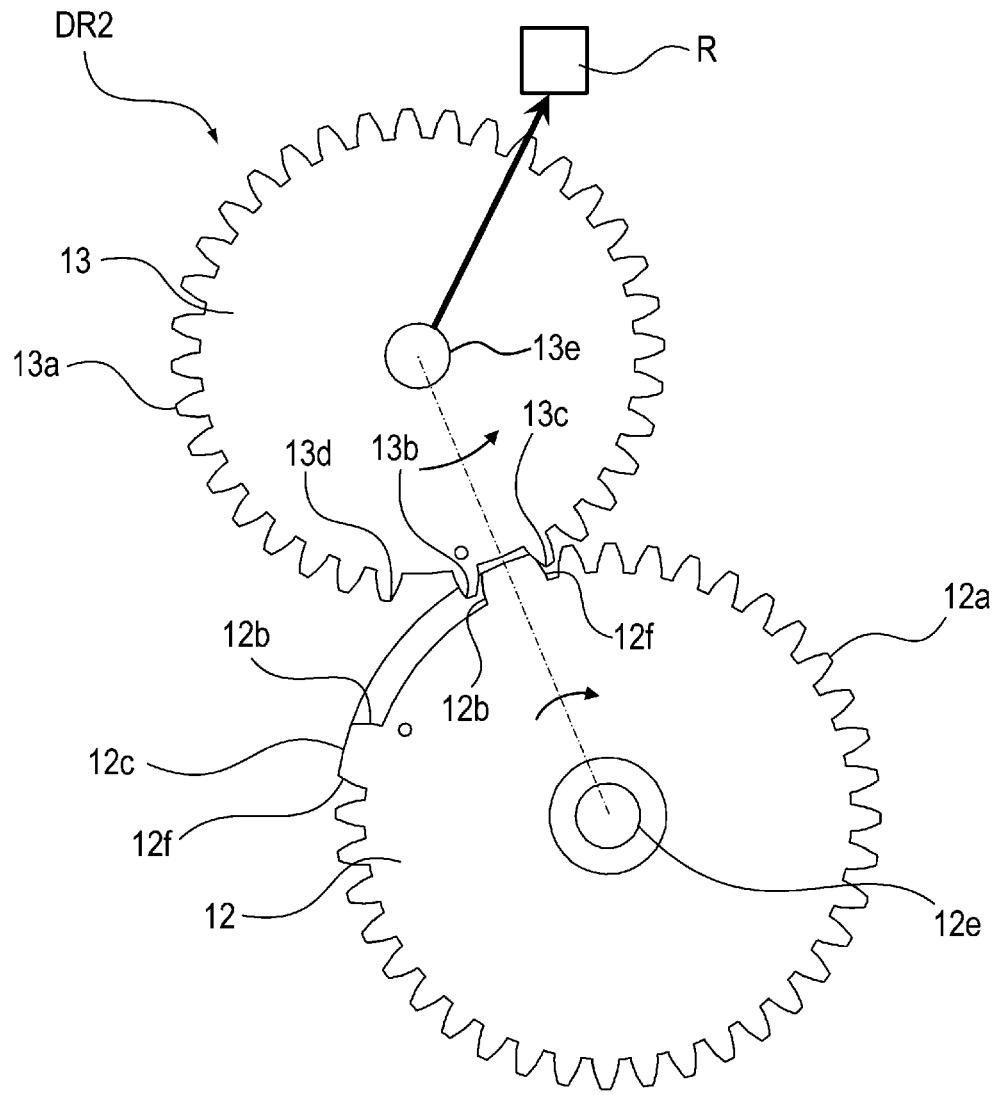
FIG. 20 is a schematic view of the gear pair DR2 immediately before an end of the drive transmission as seen from the front side.

Using FIGS. 15-22, the gear pair DR2 in this embodiment will be described. FIG. 15 is a schematic view of the gear pair DR2 in this embodiment as seen from the front side. FIG. 16 is an enlarged (detailed) schematic view of the gear pair DR2. FIG. 17 is a schematic view of the gear pair DR2 in a stand-by state as seen from the front side. FIG. 18 is a schematic view of the gear pair DR2 at the time of drive transmission start as seen from the front side. FIG. 19 is a schematic view of the gear pair DR2 in a drive transmission state as seen from the front side. FIG. 20 is a schematic view of the gear pair DR2 at the time immediately before drive transmission end.

Figure 21:
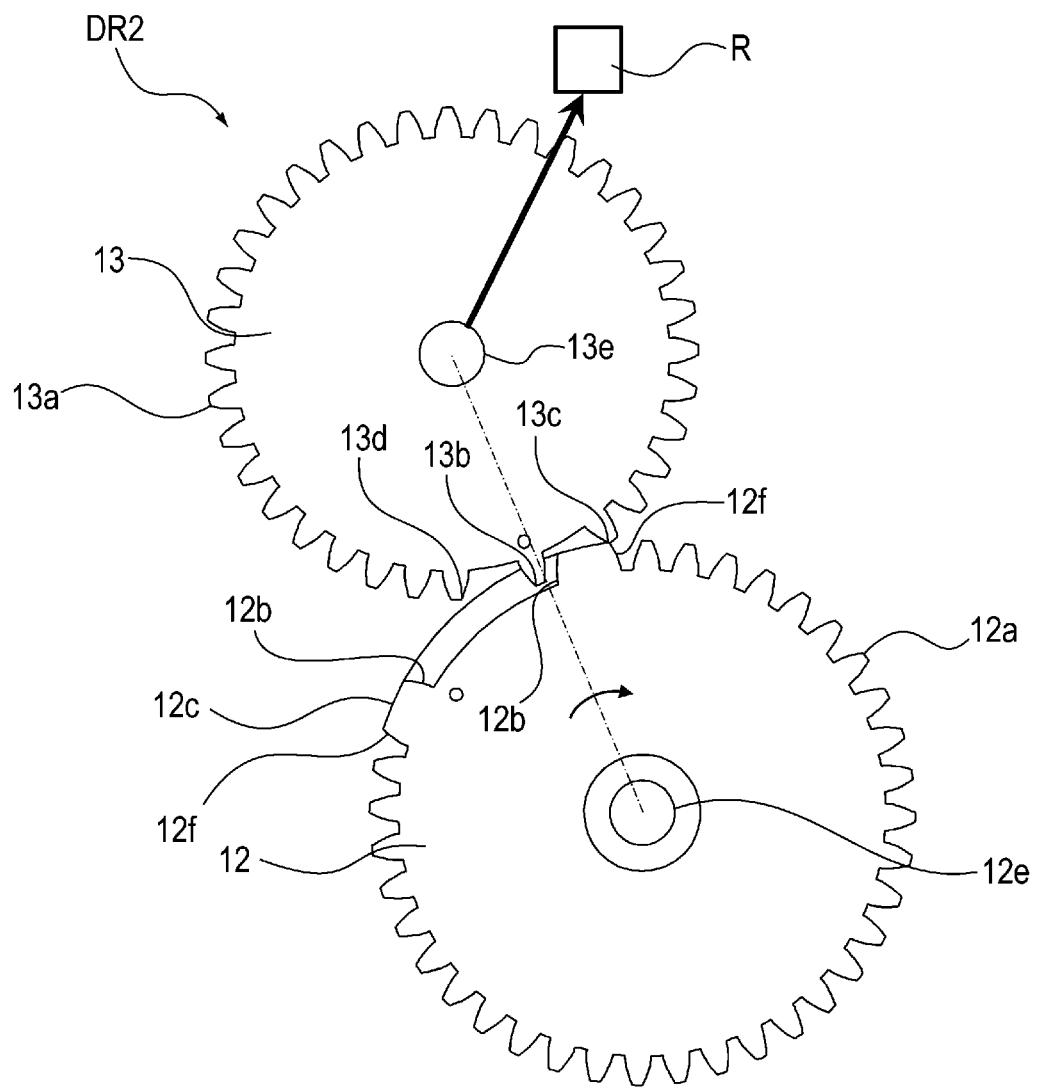
FIG. 21 is a schematic view of the gear pair DR2 at the time of the end of the drive transmission as seen from the front side.
Figure 22:
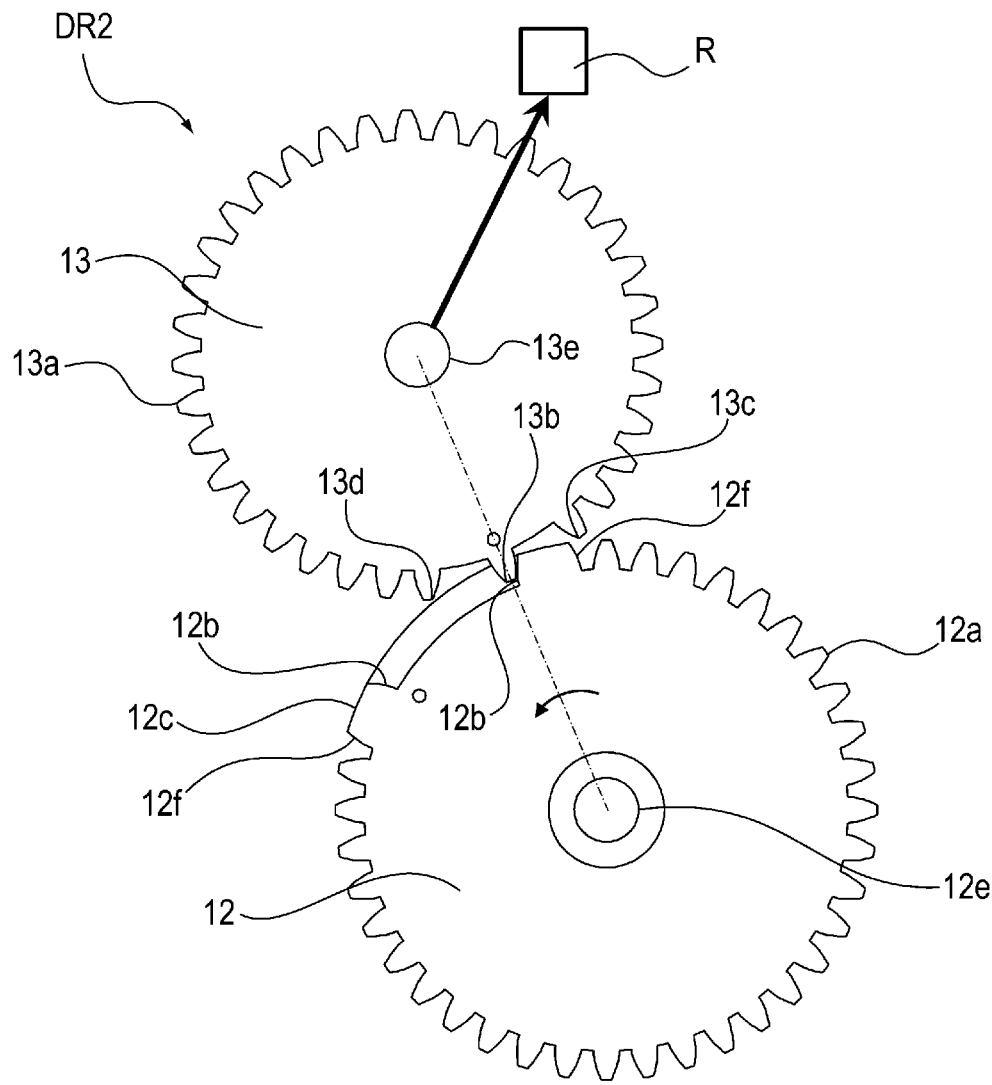
FIG. 22 is a schematic view of the gear pair DR2, as seen from the front side, at the time of a start of the drive transmission when an intermittent input gear 12 is reversed.
Figure 23:
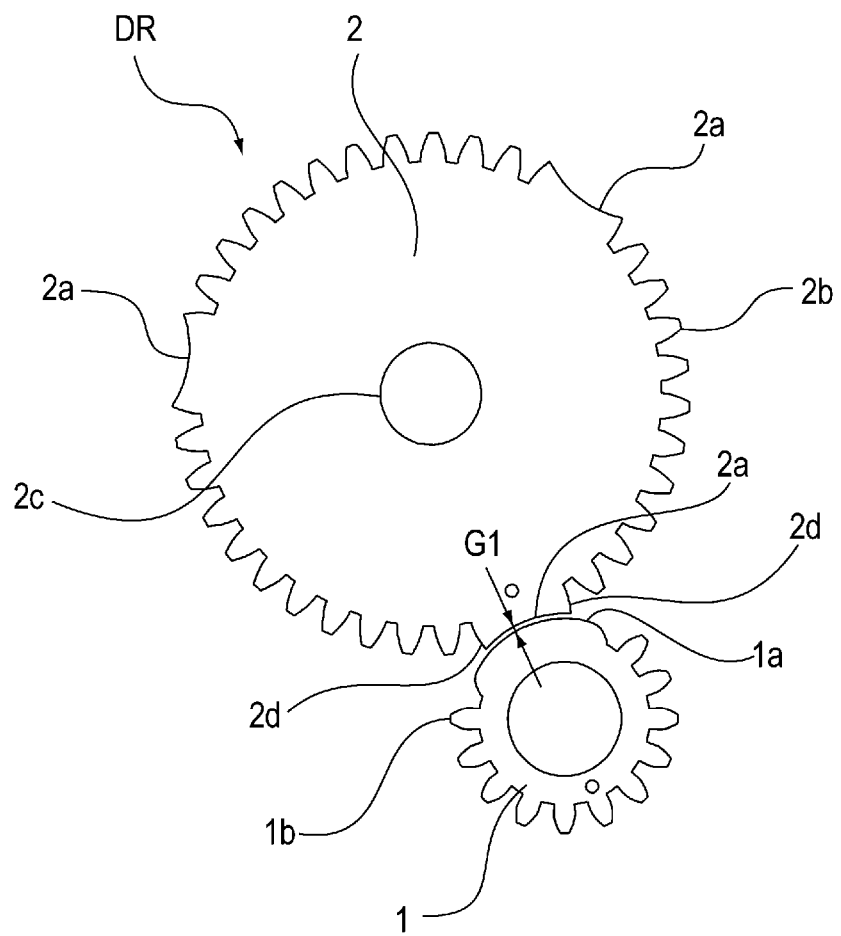
FIG. 23 is a schematic view showing a state in which a convex arcuate surface 1a of a first rotatable member 1 and a concave arcuate surface 2a of a second rotatable member oppose each other.
Figure 24:
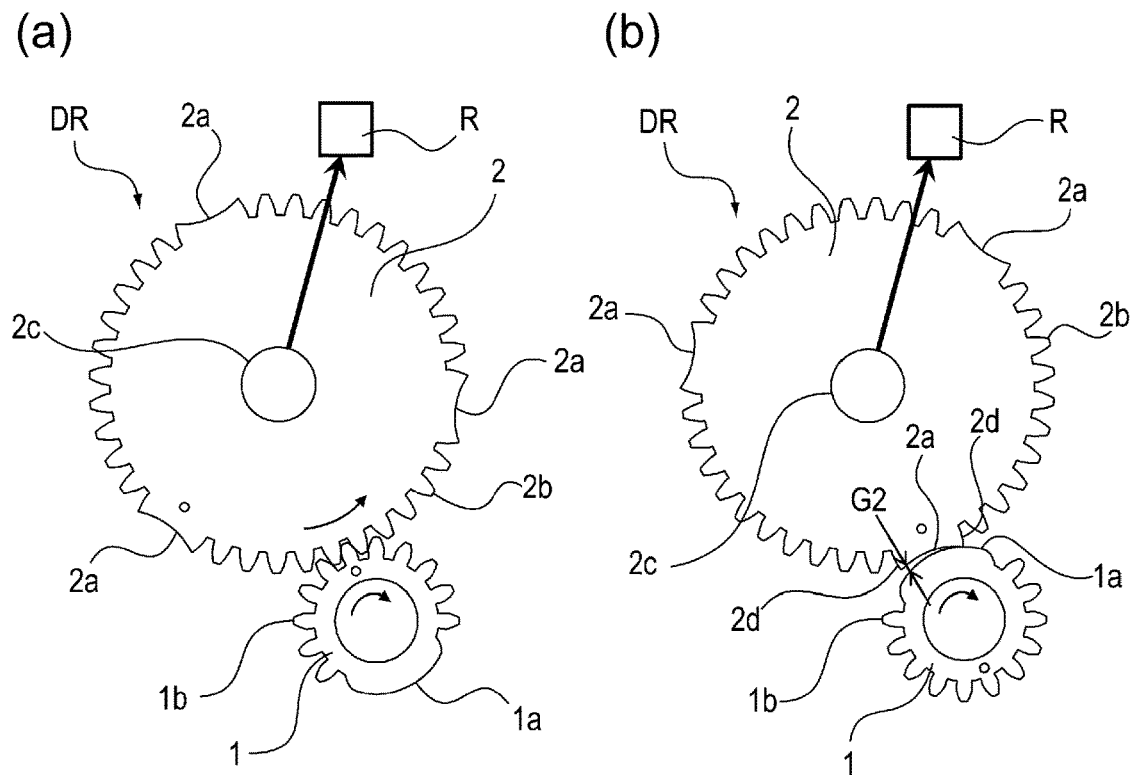
In FIG. 24, (a) is a schematic view showing a state in which a first rotatable member gear portion 1a engages with a second rotatable member gear portion 2a, (b) is a schematic view showing a state in which the convex arcuate surface 1a of the first rotatable member 1 and the concave arcuate surface 2a of the second rotatable member 2 oppose each other, and (c) is a schematic view showing a state immediately before the first rotatable member gear portion 1b rotates the second rotatable member 2.
Figure 24:
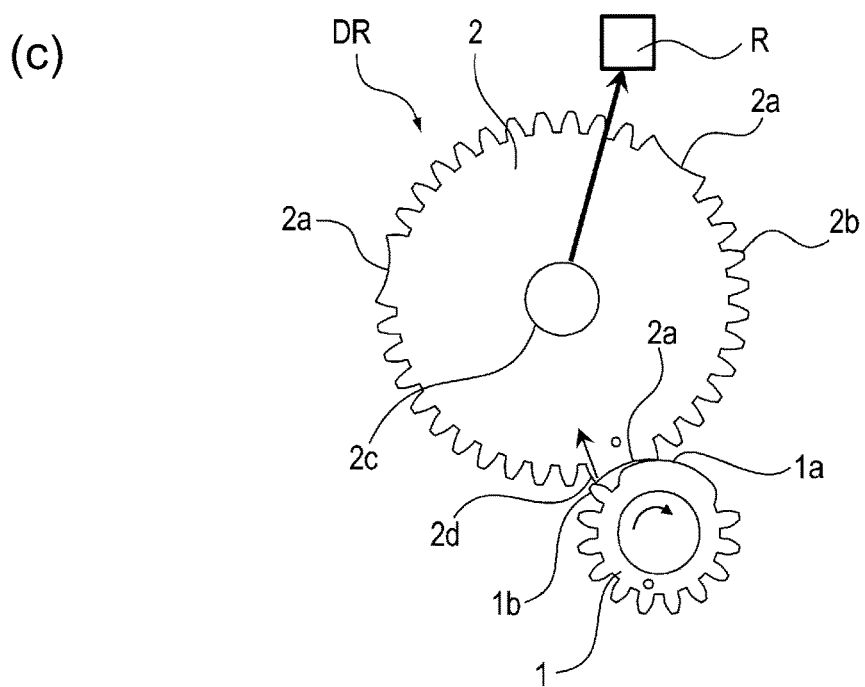

FIG. 21 is a schematic view of the gear pair DR2 at the time of the drive transmission end as seen from the front side. FIG. 22 is a schematic view of the gear pair DR2 at the time of drive transmission start, when the intermittent input gear 12 is reversely rotated, as seen from the front side. Incidentally, in this embodiment, constituent elements similar to those in First Embodiment are represented by the same reference numerals or symbols and will be omitted from description.

A drive transmission constitution of the gear pair DR2 will be described. As shown in FIG. 15, similarly as in First Embodiment, the gear pair DR2 drives the driven member R by transmitting the driving force from the driving source M (not shown) to intermittent output gear 13 through an intermittent input gear 12.

The intermittent input gear 12 includes, as shown in FIG. 15, a first input gear portion 12a and a second input gear portion 12b which are configured to drive the intermittent output gear 13, a limiting portion 12c for limiting rotation of the intermittent output gear 13, and a bearing portion 12e. A plurality of second input gear portions 12b are adjacent to the limiting portion 12c with respect to a facewidth direction (rotational axis direction), and are disposed at two positions in this embodiment.

In this embodiment, the first input gear portion 12a and the second input gear portion 12b are gears of the same module and have the tooth-number diameter corresponding to 40 teeth, and the toothed portion forming the first input gear portion 10a is constituted by 32 teeth.

The limiting portion 12c has a convex arcuate surface shape which is concentrical with a rotation center of the intermittent input gear 12 and which has a diameter equal to an addendum circle diameter of the intermittent input gear 12, and a rotational direction width of a convex arcuate surface is constituted correspondingly to 8 teeth of the first input gear portion 12a. A phase arrangement of the second input gear portion 12b and the tooth surface 12f is the same as the phase arrangement of the tooth surface of the first input gear portion 12a.

The intermittent output gear 13 is provided with a first output gear portion 13a engageable with the first input gear portion 12a, a second output gear portion 13b engageable with the second input gear portion 12b, and a downstream contact portion 13c and an upstream contact portion 13d which are contactable to the limiting portion 12c. The intermittent output gear 13 is provided with a rotation shaft 13e, and the rotation shaft 13e is connected with the driven member R.

In this embodiment, the first output gear portion 13a and the second output gear portion 13b are gears of the same module. In this embodiment, the first output gear portion 13a and the second output gear portion 13b have the tooth-number diameter corresponding to 36 teeth, and the toothed portion forming the first output gear portion 13a is constituted by 33 teeth, and the toothed portion forming the second output gear portion 13b is constituted by a single tooth.

The downstream contact portion 13c and the upstream contact portion 13d are, as shown in FIG. 16, the tops of tooth surfaces of the gear of the first output gear portion 13a. In this embodiment, a shape of each of the downstream contact portion 13c and the upstream contact portion 13d is a point of intersection of an addendum circle and the tooth surface of the first output gear portion 13a, and an arcuate portion connecting these two points of intersection providing a center as a rotation center is concentrical with the limiting portion 12c and is constituted by having a diameter which is somewhat larger than the diameter of the limiting portion 12c by adding the arcuate surface gap G1 to the limiting portion 12c. The number of teeth between the downstream contact portion 13c and the upstream contact portion 13d including the teeth formed as the downstream contact portion 13c and the upstream contact portion 13d corresponds to 5 teeth.

The second output gear portion 13b is constituted in the same phase arrangement as the first output gear portion 13a, and is disposed at a central portion between teeth formed as the downstream contact portion 13c and the upstream contact portion 13d. A width of the gear of the second output gear portion 13b with respect to a rotational axis direction is smaller than the facewidth of the first output gear portion 13a so as to engage with the second input gear portion 12b.

The intermittent input gear 12 and the intermittent output gear 13 are caused to be in relative rotational phase with each other so that the limiting portion 12c and the downstream and upstream contact portions 13c, 13d extend along each other, and therefore the second output gear portion 13b is assembled so as to be disposed between two second input gear portions 12b.

As shown in FIG. 16, in a state in which the limiting portion 10c of the downstream contact portion 11c and the upstream contact portion 11d, the second output gear portion 13b is positioned on a line connecting rotation centers of the intermittent input gear 12 and the intermittent output gear 13. As a result, an overlapping amount OL between rotation loci of the second input gear portion 13b and the second input gear portions 12b is maximum.

As shown in FIG. 17, the intermittent output gear 13 of the gear pair DR2 in the stand-by state is in the home position, and is in one-side contact state in which the downstream contact portion 13c contacts the limiting portion 12c but the upstream contact portion 13d does not contact the limiting portion 12c. An arcuate surface gap G2 at this time is larger than the arcuate surface gap G1 (G2>G1), and the second output gear portion 13b is positioned substantially on the line connecting the rotation centers of the intermittent input gear 12 and the intermittent output gear 13.

As shown in FIG. 18, when the intermittent input gear 12 rotates in a predetermined amount, the gear of the second input gear portion 12b engages with the second output gear portion 13b, so that rotation of the intermittent output gear 13 is started. At this time, the overlapping amount OL between the rotation loci of the second output gear portion 13b and the second input gear portions 12b is maximum as described above. For that reason, compared with First Embodiment, an amount of engagement of the gear of the intermittent output gear 13 with the gear of the intermittent input gear 12 at the time of rotation start from the intermittent state can be increased. As a result, the second input gear portion 12b can engage with the second output gear portion 13b with reliability.

As shown in FIG. 19, when the intermittent input gear 12 further rotates, the first input gear portion 12a engages with the first output gear portion 13a, so that the intermittent output gear 13 is rotated. By the rotation of the intermittent output gear 13, the driving force from the driving source M is transmitted to the driven member R via the rotation shaft 13e.

As shown in FIG. 20, the tooth surface 12f of the intermittent input gear 12 engages and mesh with the tooth surface of the first output gear portion 13a where the downstream contact portion 13c of the intermittent output gear 13 is formed, so that the gear pair DR2 is in a state immediately before the end of the drive transmission.

As shown in FIG. 21, simultaneously with the end of the engagement of the tooth surface 12f with the first output gear portion 13a where the downstream contact portion 13c of the intermittent output gear 13 is formed by the rotation of the intermittent input gear 12, the limiting portion 12c contacts and slides with the downstream contact portion 13c. At this time, the intermittent output gear 13 is positioned at the home position where the limiting portion 12c and the downstream and upstream contact portions 13c, 13d oppose each other, so that the rotation thereof stops. By the stop of the rotation of the intermittent output gear 13, the driving force toward the driven member R is not transmitted from the intermittent output gear 13. From this state, the intermittent input gear 12 rotates until the intermittent input gear 12 is in the stand-by state shown in FIG. 17, while the limiting portion 12c slides with the downstream contact portion 13c.

As described above, according to this embodiment, the gear pair DR2 has an effect similar to that in First Embodiment. Further, as an effect of this embodiment, by disposing the second output gear portion 13b on the line connecting the rotation centers of the intermittent input gear 12 and the intermittent output gear 13, the overlapping amount which is the engagement amount between the second output gear portion 13b and the second input gear portion 12b can be made maximum.

The shape of each of the downstream contact portion 13c and the upstream contact portion 13d is not the concave arcuate surface shape, but is made a shape such that each of the contact portions contacts and slides with the convex arcuate surface of the limiting portion 12c at a point, whereby the shape of the intermittent output gear 13 can be more simplified.

Further, as shown in FIG. 22, the second input gear portion 12b is provided adjacently to the limiting portion 12c with respect to the facewidth direction and is disposed at two positions with respect to the rotational direction. As a result, even when the intermittent input gear 12 is rotated in either one of the normal direction and the reverse direction, the second input gear portion 12b engages with the second output gear portion 13b with reliability, so that the intermittent output gear 13 can be rotated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-035429 filed on Feb. 26, 2016, which is hereby incorporated by reference herein in its entirety.

What is claimed is:

1. A drive transmission device comprising:
a rotatable driving member to which a driving force is transmitted from a driving source;
a first gear configured to be rotated by receiving the driving force from said rotatable driving member; and
a second gear configured to rotate a driven member by being rotated by rotation of said first gear,
wherein said first gear includes a driving portion consisting of a plurality of first teeth and configured to drive said second gear, a convex portion having an arcuate shape concentric with a rotation center of said first gear and an engaging portion located at a position shifted from said convex portion with respect to a rotational axis direction of said first gear,
wherein said second gear includes a driven portion consisting of a plurality of second teeth engageable with associated first teeth and configured to be driven by said driving portion, a contact portion configured to contact said convex portion, and a portion-to-be-engaged engageable with said engaging portion and located at a position shifted from said contact portion with respect to a rotational axis direction of said second gear,
wherein a distance between said portion-to-be-engaged and an adjacent upstream second tooth of said driven portion with respect to a rotational direction of said second gear is larger than a distance between adjacent second teeth of said driven portion, and
wherein in a state in which said convex portion slides on said contact portion so as not to rotate said second gear when said first gear rotates, said engaging portion engages with said portion-to-be-engaged such that said contact portion separates from said convex portion, and said driving portion engages with said driven portion so as to transmit the driving force from said first gear to said second gear.

2. The drive transmission device according to claim 1, wherein a tooth surface of a gear is formed on each of end portions of said convex portion of said first gear with respect to a rotational direction, at least one of the tooth surfaces being engageable with said driven portion, and a shape formed by a tooth top of the tooth surfaces and said convex portion is a convex shape such that the shape does not protrude from a shape formed by said convex portion and a curve of the tooth surface.

3. The drive transmission device according to claim 1, wherein an arcuate diameter of said convex portion of said first gear is equal to an addendum circle diameter of said engaging portion.

4. The drive transmission device according to claim 1, wherein said contact portion of said second gear is a top portion of a tooth top of said portion-to-be-engaged.

5. The drive transmission device according to claim 1, wherein said engaging portion is adjacent to said convex portion with respect to the rotational axis direction of said first gear, and
wherein said portion-to-be-engaged is adjacent to said contact portion with respect to the rotational direction of said second gear.

6. The drive transmission device according to claim 5, wherein a phase of a tooth surface of said engaging portion is the same as a phase of a tooth surface of said driving portion, and a phase of a tooth surface of said portion-to-be-engaged is the same as a phase of a tooth surface of said driven portion.

* * * * *